United States Patent
Tsuiki et al.

(10) Patent No.: US 9,634,548 B2
(45) Date of Patent: Apr. 25, 2017

(54) METHOD FOR MANUFACTURING AN ARMATURE WINDING FOR AN ELECTRIC MACHINE

(71) Applicant: MITSUBISHI ELECTRIC CORPORATION, Tokyo (JP)

(72) Inventors: Hironori Tsuiki, Tokyo (JP); Hiroyuki Akita, Tokyo (JP); Atsushi Sakaue, Tokyo (JP); Masaya Inoue, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 269 days.

(21) Appl. No.: 14/425,425

(22) PCT Filed: Aug. 27, 2013

(86) PCT No.: PCT/JP2013/072857
§ 371 (c)(1),
(2) Date: Mar. 3, 2015

(87) PCT Pub. No.: WO2014/050409
PCT Pub. Date: Apr. 3, 2014

(65) Prior Publication Data
US 2015/0229189 A1   Aug. 13, 2015

(30) Foreign Application Priority Data

Sep. 26, 2012  (JP) .................................. 2012-212671

(51) Int. Cl.
*H02K 15/00*  (2006.01)
*H02K 15/04*  (2006.01)
(Continued)

(52) U.S. Cl.
CPC ........... *H02K 15/0435* (2013.01); *H02K 3/12* (2013.01); *H02K 15/045* (2013.01);
(Continued)

(58) Field of Classification Search
CPC ......... Y10T 29/49009; Y10T 29/49071; Y10T 29/53143; Y10T 29/49073; H01F 41/06;
(Continued)

(56) References Cited

U.S. PATENT DOCUMENTS 4,450,708 A * 5/1984 King ..................... H02K 15/045
72/295
6,951,054 B2 * 10/2005 Hirota ....................... H02K 3/12
29/596
(Continued)

FOREIGN PATENT DOCUMENTS

CN       101180145 A    5/2008
JP    2004-104841 A    4/2004
(Continued)

OTHER PUBLICATIONS

Office Action issued on Aug. 29, 2016, by the Chinese Patent Office in corresponding Chinese Patent Application No. 201380056023.8, and an English Translation of the Office Action. (11 pages).
(Continued)

*Primary Examiner* — Thiem Phan
(74) *Attorney, Agent, or Firm* — Buchanan Ingersoll & Rooney PC

(57) ABSTRACT

In this method for manufacturing an armature winding for an electric machine, a rectangular conductor wire is wound helically by bending and shaping linking portions between rectilinear portions and coil ends to set angles while feeding the rectangular conductor wire, by repeating steps in which the rectangular conductor wire is fed by a set amount of feeding, the rectangular conductor wire is gripped and fixed by first through fourth chucks, the rectangular conductor wire is bent by pressing a first former near a root of the rectangular conductor wire, and gripping and fixing of the rectangular conductor wire by the first through fourth chucks is released.

7 Claims, 19 Drawing Sheets

(51) Int. Cl.
 *H02K 3/12* (2006.01)
 *H02K 15/06* (2006.01)
(52) U.S. Cl.
 CPC ....... *H02K 15/0464* (2013.01); *H02K 15/066* (2013.01); *Y10T 29/49009* (2015.01); *Y10T 29/49071* (2015.01); *Y10T 29/53143* (2015.01)
(58) Field of Classification Search
 CPC . H01F 41/071; H01F 41/064; H02K 15/0485; H02K 15/09; H02K 15/0435
 USPC ......... 29/596, 605, 606, 732; 72/295, 481.5; 310/179, 184
 See application file for complete search history.

(56) References Cited

U.S. PATENT DOCUMENTS

| | | | |
|---|---|---|---|
| 8,550,125 B2 * | 10/2013 | Hattori | H01F 27/2847 140/71 C |
| 2004/0040142 A1 | 3/2004 | Hirota et al. | |
| 2007/0079642 A1 | 4/2007 | Bibeau et al. | |
| 2011/0095639 A1 | 4/2011 | Nakamura | |
| 2012/0181891 A1 | 7/2012 | Yamada et al. | |

FOREIGN PATENT DOCUMENTS

| | | |
|---|---|---|
| JP | 2004-297863 A | 10/2004 |
| JP | 2008-535226 A | 8/2008 |
| JP | 2010-220316 A | 9/2010 |
| JP | 2011-109899 A | 6/2011 |
| JP | 2011-259636 A | 12/2011 |

OTHER PUBLICATIONS

Office Action issued on Jun. 2, 2015, by the Japanese Patent Office in corresponding Japanese Patent Application No. 2014-538296, and an English Translation of the Office Action.(8 pages).
International Search Report (PCT/ISA/210) mailed on Dec. 3, 2013, by the Japanese Patent Office as the International Searching Authority for International Application No. PCT/JP2013/072857.
Written Opinion (PCT/ISA/237) mailed on Dec. 3, 2013, by the Japanese Patent Office as the International Searching Authority for International Application No. PCT/JP2013/072857.

* cited by examiner

METHOD FOR MANUFACTURING AN ARMATURE WINDING FOR AN ELECTRIC MACHINE

TECHNICAL FIELD

The present invention relates to a method for manufacturing an armature winding is used in electric machines such as rotary electric machines such as electric motors or generators, or direct acting machines such as linear motors.

BACKGROUND ART

In recent years, compactness, high output, and high quality have been required in rotary electric machines such as electric motors or generators. With regard to downsizing rotary electric machines of this kind, armature windings that have concentrated windings in which conductor wires are wound onto individual armature core teeth have been used with a view to downsizing coil ends, which do not generate effective magnetic flux. However, armatures that use armature windings of distributed winding construction that can suppress torque pulsation and increase output are in demand. In addition, rectangular conductor wire, unlike thin circular wire, enables reductions in winding resistance and increases in space factor, but because it has great rigidity and is difficult to deform, production of armature windings has been difficult.

Now, in contrast to concentrated windings, which are configured by winding conductor wires onto individual teeth, windings that are configured by winding conductor wires into slots that are separated by greater than or equal to two slots are designated "distributed windings". In other words, distributed windings are wound such that a conductor wire that extends outward from one slot spans two or more consecutive teeth and enters another slot.

In conventional rotary electric machines such as that described in Patent Literature 1, a reference unit of an armature winding has been produced by producing a helical first intermediate coil by winding a rectangular conductor wire a plurality of times into an edgewise winding (a coiling step), producing a second intermediate coil that has a set outer circumferential shape by bending and shaping the first intermediate coil using a pressing die (an outer circumference forming step), producing a third intermediate coil that has a circular arc-shaped semicircular portion by bending and shaping a first coil end of the second intermediate coil using a pressing die (a circular arc forming step), forming a lane changing portion by bending and shaping the first coil end of the third intermediate coil using a pressing die (a lane changing portion forming step), and bending a second coil end of the third intermediate coil radially inward using a pressing die (a bending step).

CITATION LIST

Patent Literature

[Patent Literature 1]: Japanese Patent Laid-Open No. 2011-259636 (Gazette)

SUMMARY OF THE INVENTION

Problem to be Solved by the Invention

However, in Patent Literature 1, in each of the steps for producing the standard unit of the armature winding, a bundle of rectangular conductor wire that is wound into an edgewise winding is bent by punching and bending that uses a pressing die. Thus, because conditions such as springback after bending change if the material or dimensions of the rectangular conductor wire are modified, one problem has been that steps during setup, such as changing pressing dies, are increased, reducing productivity. In addition, because bundles of rectangular conductor wire are folded and bent simultaneously, large flexural stresses act on the rectangular conductor wire, and another problem has been that an insulating coating that is coated onto the rectangular conductor wire may be damaged, reducing insulation performance.

The present invention aims to solve the above problems and an object of the present invention is to provide a method for manufacturing an armature winding for an electric machine that can improve productivity by maximally reducing steps that involve punching and bending that uses a pressing die, to enable tool modifying steps and setup steps that accompany modifications to wire material, dimensions, etc., to be reduced, and that can also improve insulation performance by suppressing the occurrence of damage to an insulating coating that is coated onto a conductor wire.

Means for Solving the Problem

In order to achieve the above object, according to one aspect of the present invention, there is provided a method for manufacturing an armature winding for an electric machine, the armature winding including a plurality of winding bodies that are each configured by winding a rectangular conductor wire into a helical shape for m turns, where m is a natural number that is greater than or equal to two, so as to include: rectilinear portions that are arranged into two columns such that m of the rectilinear portions line up in each of the columns; and coil ends that link together end portions of the rectilinear portions between the columns, crank portions that displace the rectilinear portions that are linked by the coil ends by a set amount in a direction of arrangement of the rectilinear portions being formed centrally on the coil ends, and the plurality of winding bodies each being arranged at a pitch of one slot in a direction of arrangement of slots such that each of the columns of the rectilinear portions that are arranged into two columns are housed in respective slots of the armature core that are positioned on two sides of a consecutive plurality of teeth, wherein the rectangular conductor wire is wound helically such that linking portions between the rectilinear portions and the coil ends are shaped by bending to set angles while feeding the rectangular conductor wire, by repeating: a conductor wire feeding step in which the rectangular conductor wire is fed in a longitudinal direction of the rectangular conductor wire by a set amount of feeding; a conductor wire fixing step in which the rectangular conductor wire is gripped and fixed by a gripping jig; a conductor wire bending step in which compression bending is performed on the rectangular conductor wire by pressing a former against a root of the rectangular conductor wire that projects out of the gripping jig; and a conductor wire fixing releasing step in which gripping and fixing of the rectangular conductor wire by the gripping jig is released.

Effects of the Invention

According to the present invention, because linking portions between rectilinear portions and coil ends in a winding body are shaped by bending using compression bending that uses a former, steps that involve punching and bending that uses a pressing die are reduced. Thus, tool modifying steps and setup steps that accompany modifications to wire material, dimensions, etc., can be minimized, enabling productivity to be improved, and the occurrence of damage to an insulating coating that is coated onto the rectangular conductor wire is suppressed, enabling insulation performance to be improved.

Because the linking portions between the rectilinear portions and the coil ends are shaped by bending to set angles while feeding the rectangular conductor wire, stresses that act on the rectangular conductor wire are reduced, suppressing the occurrence of damage to the insulating coating that is coated onto the rectangular conductor wire, and enabling insulation performance to be improved.

DESCRIPTION OF EMBODIMENTS

Preferred embodiments of the method for manufacturing an armature winding for an electric machine according to the present invention will now be explained with reference to the drawings.

Embodiment 1

Figure 1:
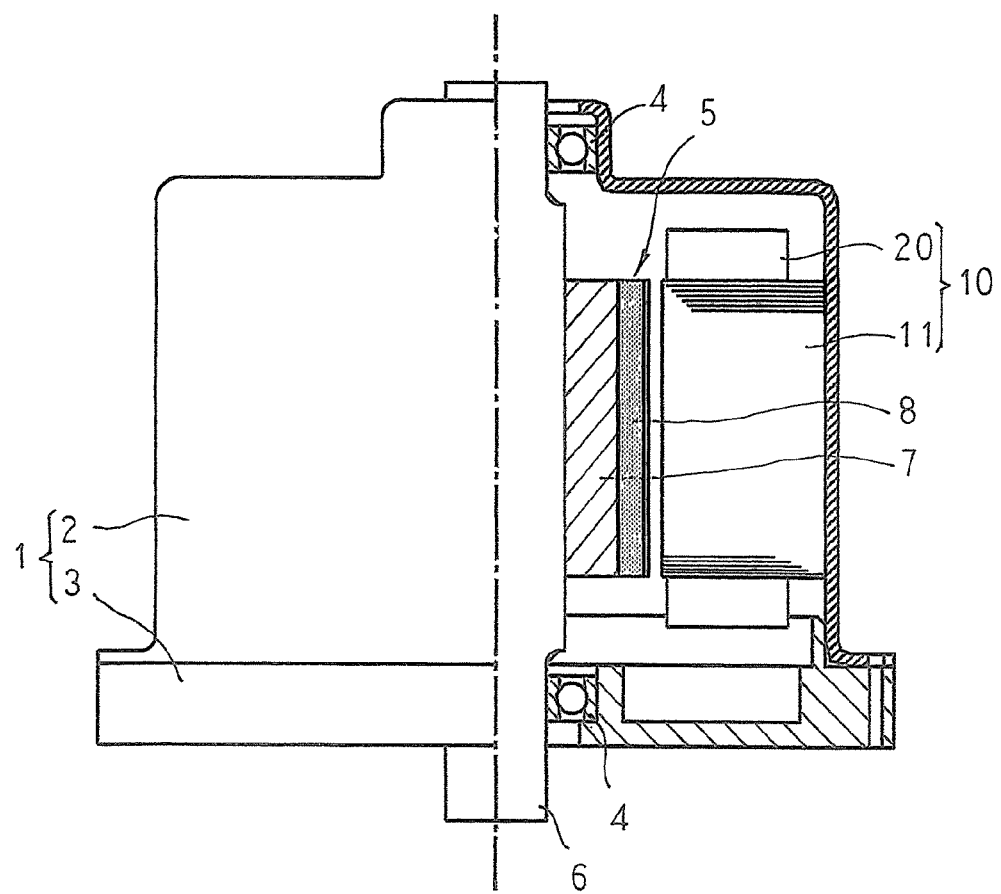
FIG. 1 is a half section that shows a rotary electric machine according to Embodiment 1 of the present invention.
Figure 2:
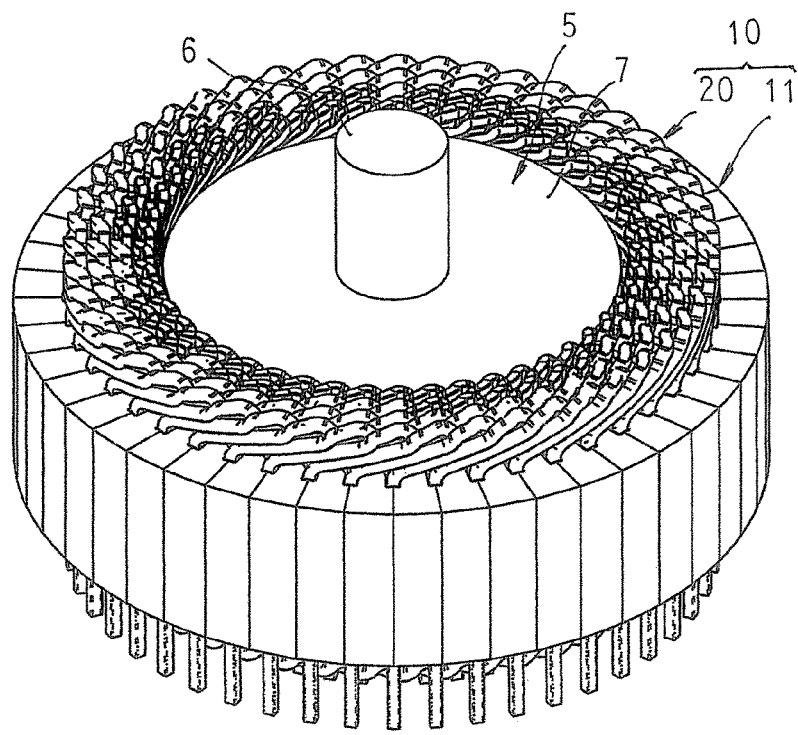
FIG. 2 is an oblique projection that shows part of the rotary electric machine according to Embodiment 1 of the present invention.
Figure 3:
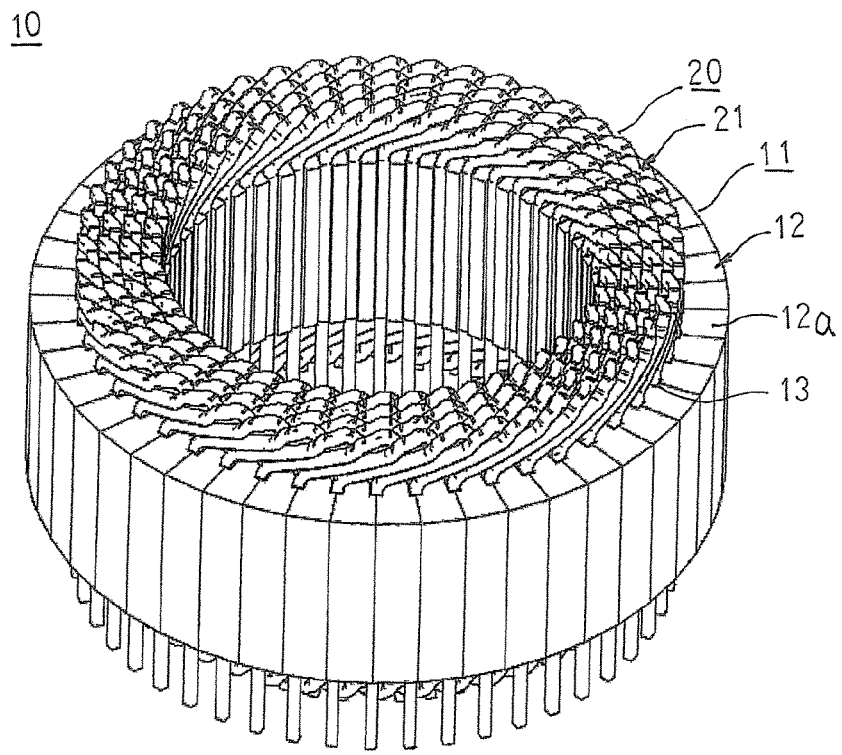
FIG. 3 is an oblique projection that shows an armature that is used in the rotary electric machine according to Embodiment 1 of the present invention.
Figure 4:
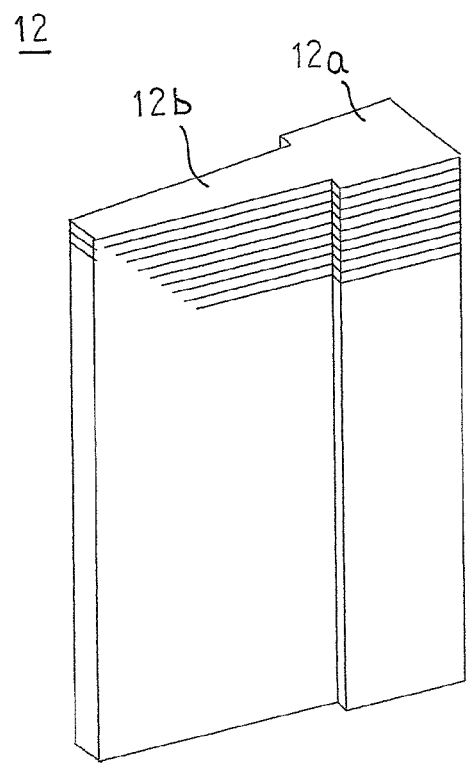
FIG. 4 is an oblique projection that shows a core block that constitutes an armature that is used in the rotary electric machine according to Embodiment 1 of the present invention.
Figure 5:
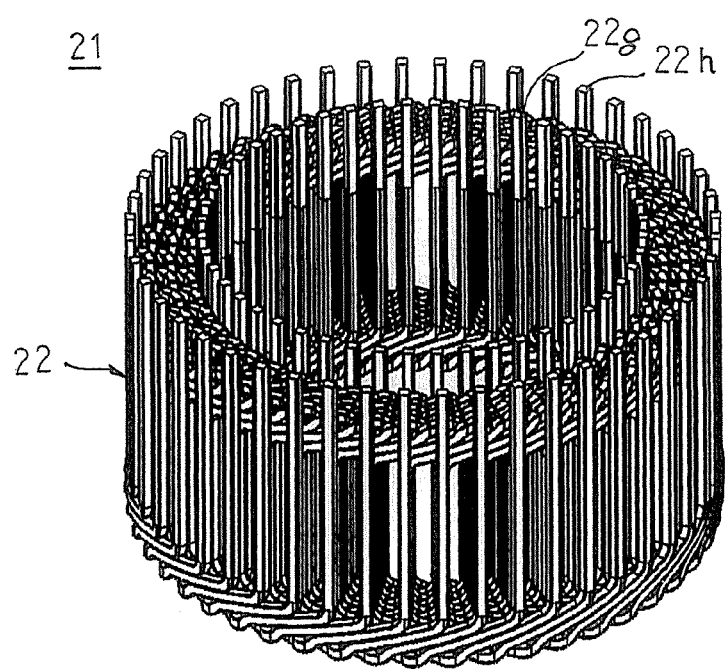
FIG. 5 is an oblique projection that shows a winding assembly that constitutes an armature winding of the armature that is used in the rotary electric machine according to Embodiment 1 of the present invention.
Figure 6:
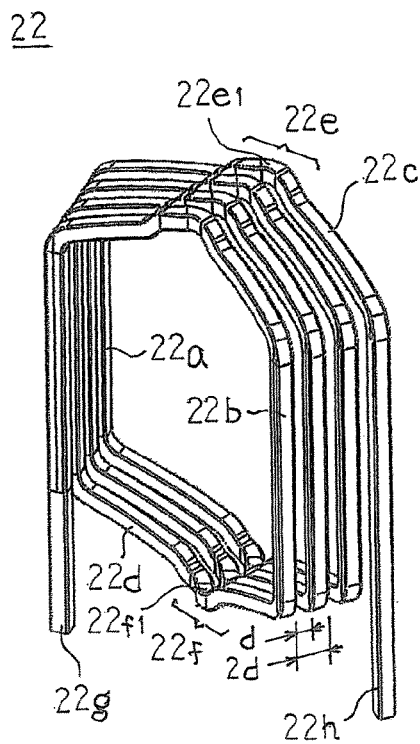
FIG. 6 is an oblique projection that shows a winding body that constitutes the winding assembly in the rotary electric machine according to Embodiment 1 of the present invention.
Figure 7:
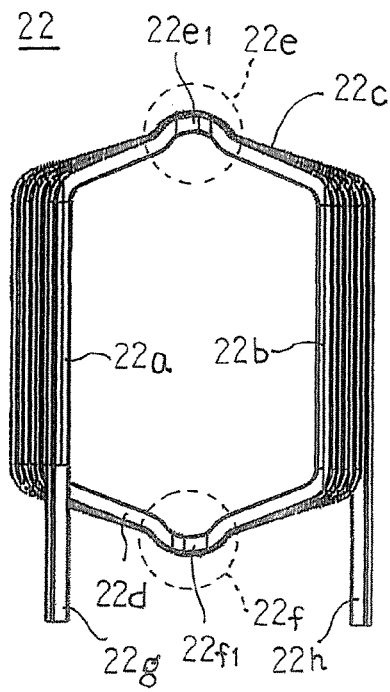
FIG. 7 is a front elevation that shows the winding body that constitutes the winding assembly in the rotary electric machine according to Embodiment 1 of the present invention.
Figure 8:
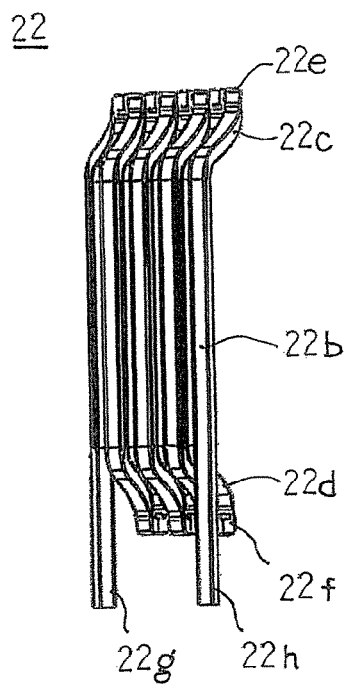
FIG. 8 is a side elevation that shows the winding body that constitutes the winding assembly in the rotary electric machine according to Embodiment 1 of the present invention.
Figure 9:
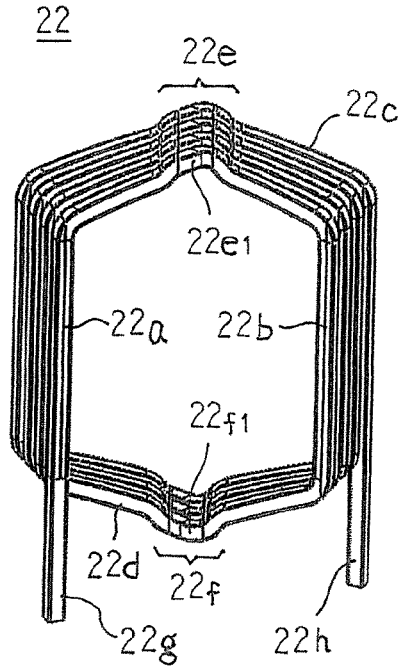
FIG. 9 is an oblique projection of the winding body that constitutes the winding assembly in the rotary electric machine according to Embodiment 1 of the present invention when viewed from obliquely above a front surface.
Figure 10:
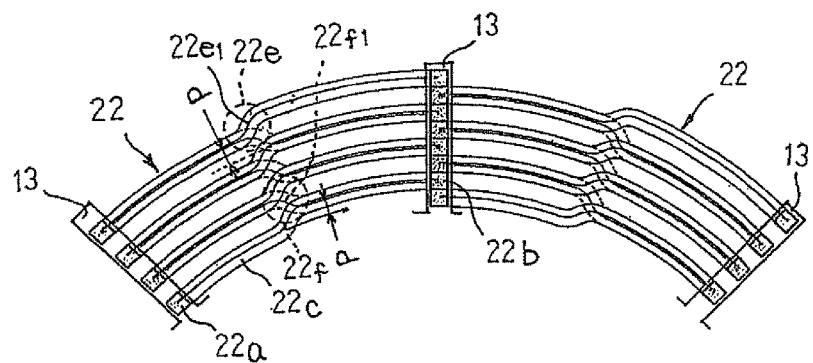
FIG. 10 is a partial end elevation of a state in which two winding bodies in the rotary electric machine according to Embodiment 1 of the present invention are mounted into the armature core so as to share a single slot when viewed from a side near a first axial end.
Figure 11:
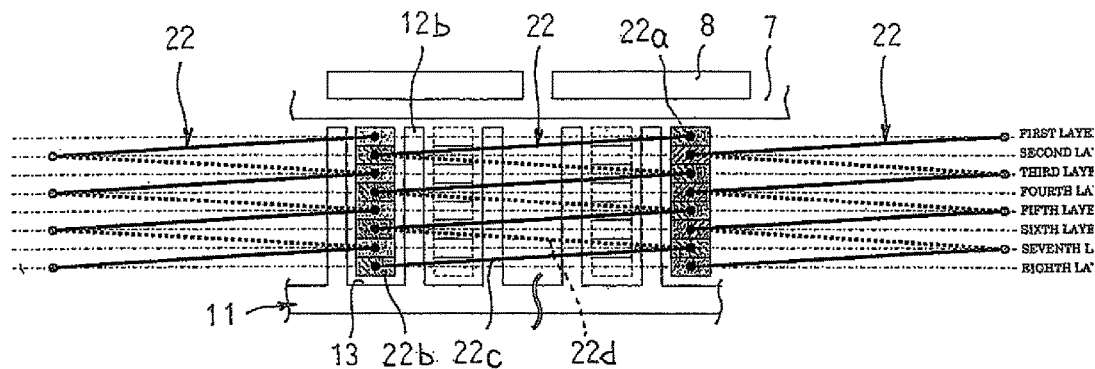
FIG. 11 is a developed projection of a state in which three winding bodies in the rotary electric machine according to Embodiment 1 of the present invention are mounted into identical slot groups of the armature core consecutively in a circumferential direction when viewed from a side near a first axial end.
Figure 12:
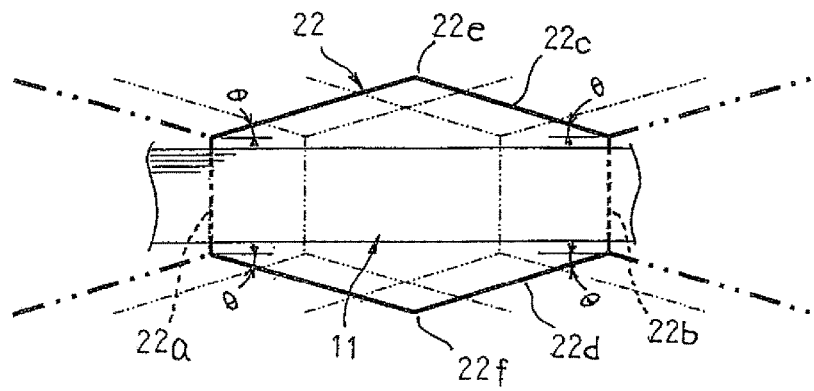
FIG. 12 is a developed projection that shows a state in which three winding bodies in the rotary electric machine according to Embodiment 1 of the present invention are mounted into identical slot groups of the armature core consecutively in the circumferential direction when viewed from radially outside.

FIG. 1 is a half section that shows a rotary electric machine according to Embodiment 1 of the present invention, FIG. 2 is an oblique projection that shows part of the rotary electric machine according to Embodiment 1 of the present invention, FIG. 3 is an oblique projection that shows an armature that is used in the rotary electric machine according to Embodiment 1 of the present invention, FIG. 4 is an oblique projection that shows a core block that constitutes an armature that is used in the rotary electric machine according to Embodiment 1 of the present invention, FIG. 5 is an oblique projection that shows a winding assembly that constitutes an armature winding of the armature that is used in the rotary electric machine according to Embodiment 1 of the present invention, FIG. 6 is an oblique projection that shows a winding body that constitutes the winding assembly in the rotary electric machine according to Embodiment 1 of the present invention, FIG. 7 is a front elevation that shows the winding body that constitutes the winding assembly in the rotary electric machine according to Embodiment 1 of the present invention, FIG. 8 is a side elevation that shows the winding body that constitutes the winding assembly in the rotary electric machine according to Embodiment 1 of the present invention, FIG. 9 is an oblique projection of the winding body that constitutes the winding assembly in the rotary electric machine according to Embodiment 1 of the present invention when viewed from obliquely above a front surface, FIG. 10 is a partial end elevation of a state in which two winding bodies in the rotary electric machine according to Embodiment 1 of the present invention are mounted into the armature core so as to share a single slot when viewed from a side near a first axial end, FIG. 11 is a developed projection of a state in which three winding bodies in the rotary electric machine according to Embodiment 1 of the present invention are mounted into identical slot groups of the armature core consecutively in a circumferential direction when viewed from a side near a first axial end, and FIG. 12 is a developed projection that shows a state in which three winding bodies in the rotary electric machine according to Embodiment 1 of the present invention are mounted into identical slot groups of the armature core consecutively in the circumferential direction when viewed from radially outside. Moreover, in FIG. 11, coil ends are represented as straight lines for simplicity.

In FIGS. 1 and 2, a rotary electric machine 100 that functions as an electric machine includes: a housing 1 that has: a floored cylindrical frame 2; and an end plate 3 that closes an opening of the frame 2; an armature 10 that is fixed to a cylindrical portion of the frame 2 in an internally fitted state; and a rotor 5 that is fixed to a rotating shaft 6 that is rotatably supported in the floor portion of the frame 2 and the end plate 3 by means of bearings 4 so as to be rotatably disposed on an inner circumferential side of the armature 10.

The rotor 5 is a permanent-magnet rotor that includes: a rotor core 7 that is fixed to the rotating shaft 6, which is inserted through a central position thereof; and permanent magnets 8 that are embedded near an outer circumferential surface of the rotor core 7 so as to be arranged at a set pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the armature 10 will be explained in detail with reference to FIGS. 3 through 9.

As shown in FIG. 3, the armature 10 includes: an armature core 11; and an armature winding 20 that is mounted onto the armature core 11. Here, to facilitate explanation, the number of poles in the rotor 5 is eight, the number of slots in the armature core 11 is forty-eight, and the armature winding 20 is a three-phase winding. In other words, the slots 13 are formed on the armature core 11 at a ratio of two slots per phase per pole. Moreover, the number of slots per phase per pole is two.

As shown in FIG. 4, core blocks 12 are made by dividing the annular armature core 11 into forty-eight equal sections circumferentially, and include: a core back portion 12a that has a circular arc-shaped cross section, that is produced by laminating and integrating a set number of electromagnetic steel sheets; and a tooth 12b that is disposed so as to extend radially inward from an inner circumferential wall surface of the core back portion 12a. The armature core 11 is configured into an annular shape by arranging and integrating forty-eight core blocks 12 circumferentially by abutting together circumferential side surfaces of the core back portions 12a such that the teeth 12b are oriented radially inward. The slots 13, which are formed by circumferentially adjacent core blocks 12, are arranged at a uniform angular pitch circumferentially so as to be open on an inner circumferential side. The teeth 12b are formed so as to have a tapered shape in which a circumferential width becomes gradually narrower radially inward, and a cross section of the slots 13 is rectangular. Here, a circumferential direction corresponds to a direction of arrangement of the slots 13.

As shown in FIG. 3, the armature winding 20 is configured by applying a connection process to the winding assembly 21 that is mounted to the armature core 11. As shown in FIG. 5, the winding assembly 21 is configured by arranging winding bodies 22 that are housed in pairs of slots 13 that are positioned on two sides of six consecutive teeth 12b circumferentially at a pitch of one slot. Winding ends 22g (described below) each project axially outward, and are arranged on a radially inner side of the winding assembly 21 at a pitch of one slot circumferentially. Winding ends 22h (described below) each project axially outward in an identical direction to the winding ends 22g, and are arranged on a radially outer side of the winding assembly 21 at a pitch of one slot circumferentially.

As shown in FIGS. 6 through 9, the winding bodies 22 are hexagonal coils that are configured by winding conductor wire that has a rectangular cross section (hereinafter "rectangular conductor wire") that is made of unjointed continuous copper wire or aluminum wire that is insulated using an enamel resin, for example, for four turns helically into an approximate hexagon shape such that flat surfaces that are constituted by long sides of the rectangular cross sections face each other, and such that a gap d that is approximately equal to a length of short sides of the rectangular cross section is ensured between the facing flat surfaces in question.

The winding bodies 22 that are configured in this manner are windings that have a distributed winding construction, and include: first and second rectilinear portions 22a and 22b that form two columns that are separated by an angular pitch of six slots in which four of each are arranged in a direction of short sides of the rectangular cross sections so as to leave gaps d in each of the columns; and first and second coil ends 22c and 22d that alternately link first longitudinal ends to each other and second longitudinal ends to each other between the columns of first and second rectilinear portions 22a and 22b. Moreover, an angular pitch of six slots is a pitch between slot centers of slots 13 on two sides of the six consecutive teeth 12b.

The first coil ends 22c extend outward at a set inclination longitudinally outward relative to the first and second rectilinear portions 22a and 22b from first ends of first rectilinear portions 22a in a first column toward second rectilinear portions 22b in a second column to central portions (first top portions 22e) between the columns of the first and second rectilinear portions 22a and 22b, and extend longitudinally inward relative to the first and second rectilinear portions 22a and 22b from the first top portions 22e toward the second rectilinear portions 22b in the second column at a set inclination in an opposite direction, and are connected to first ends of the second rectilinear portion 22b in the second column. The first top portions 22e are formed by making a central portion of the first coil ends 22c protrude in a U shape or an angular C shape. Crank portions $22e_1$ are formed by bending the first top portions 22e into a crank shape. Thus, the first rectilinear portions 22a and the second rectilinear portions 22b that are linked by the first coil ends 22c are offset in a direction of arrangement of the first and second rectilinear portions 22a and 22b by a gap d using the crank portions $22e_1$.

Similarly, the second coil ends 22d extend outward at a set inclination longitudinally outward relative to the first and second rectilinear portions 22a and 22b from second ends of second rectilinear portions 22b in a second column toward first rectilinear portions 22a in a first column to central portions (second top portions 22f) between the columns of the first and second rectilinear portions 22a and 22b, and extend longitudinally inward relative to the first and second rectilinear portions 22a and 22b from the second top portions 22f toward the first rectilinear portions 22a in the first column at a set inclination in an opposite direction, and are connected to second ends of the first rectilinear portions 22a in the first column. The second top portions 22f are formed by making a central portion of the second coil ends 22d protrude in a U shape or an angular C shape. Crank portions $22f_1$ are formed by bending the second top portions 22f into a crank shape. Thus, the first rectilinear portions 22a and the second rectilinear portions 22b that are linked by the second coil ends 22d are offset in a direction of arrangement of the first and second rectilinear portions 22a and 22b by a gap d using the crank portions $22f_1$.

In winding bodies 22 that are configured in this manner, the first and second rectilinear portions 22a and 22b, and the first and second coil ends 22c and 22d, are each arranged in the direction of the short sides of the rectangular cross sections of the rectangular conductor wire at a pitch (2d) that is approximately twice the length of the short sides such that flat surfaces that are constituted by the long sides of the rectangular cross sections of the rectangular conductor wire face each other. The first rectilinear portions 22a and the second rectilinear portions 22b, which are connected by means of the crank portions $22e_1$ and $22f_1$ of the first top portions 22e and the second top portions 22f, are offset in the direction of arrangement so as to leave a gap d. The winding bodies 22 also include: a winding end 22g that extends outward in the longitudinal direction from the second end of a first rectilinear portion 22a that is positioned at a first end in the direction of arrangement in the first column; and a winding end 22h that extends outward in the longitudinal direction from the second end of a second rectilinear portion 22b that is positioned at a second end in the direction of arrangement in the second column.

FIG. 10 shows a state in which two winding bodies 22 are respectively mounted into two consecutive pairs among pairs of slots 13 that span six consecutive teeth 12b, and FIGS. 11 and 12 show a state in which three winding bodies 22 are respectively mounted into two consecutive pairs among pairs of slots 13 that span six consecutive teeth 12b. Now, if focus is placed on a single winding body 22, a first coil end 22c that extends outward at the first axial end from a first rectilinear portion 22a in a first layer from a slot opening side of a first slot 13 extends toward a second slot 13 circumferentially at an angle of inclination θ, is shifted radially outward at a crank portion $22e_1$ of a first top portion 22e by a distance d, subsequently extends toward the second slot 13 circumferentially at a reverse angle of inclination θ, and is linked to a second rectilinear portion 22b in a second layer from the slot opening side of the second slot 13. Next, a second coil end 22d that extends outward at the second axial end from the second rectilinear portion 22b in the second layer from the slot opening side of the second slot 13 extends toward the first slot 13 circumferentially at an angle of inclination θ, is shifted radially outward at a crank portion $22f_1$ of a second top portion 22f by a distance d, subsequently extends toward the first slot 13 circumferentially at a reverse angle of inclination θ, and is linked to a first rectilinear portion 22a in a third layer from the slot opening side of the first slot 13. Here, a radial direction corresponds to a slot depth direction.

In this manner, the first rectilinear portions 22a in the first, third, fifth, and seventh layers of the first slot 13 and the second rectilinear portions 22b in the second, fourth, sixth, and eight layers of the second slot 13 are each linked into a helical shape by the first and second coil ends 22c and 22d. Inclined portions that extend from end portions of the first and second rectilinear portions 22a and 22b to the first and second top portions 22e and 22f are formed so as to have a circular arc shape when viewed from an axial direction. Curvature of the inclined portions is greater in the inclined portions that are positioned on a radially outer side. In the slot 13 that the two winding bodies 22 share, the first and second rectilinear portions 22a and 22b of the two winding bodies 22 are housed such that the long sides of the rectangular cross sections of the rectangular conductor wires are oriented circumferentially so as to line up alternately in a single column in the radial direction. As shown in FIG. 10, the first and second coil ends 22c and 22d are positioned radially further outward than tip ends of the teeth 12b of the armature core 11, and are positioned radially further inward than bottom portions of the slots 13.

Figure 13:
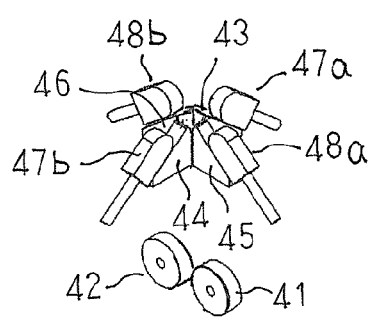
FIG. 13 is an oblique projection that explains an apparatus that is used in compression bending that is used in a method for manufacturing a winding body in the rotary electric machine according to Embodiment 1 of the present invention.

Next, a method for manufacturing of the winding bodies 22 will be explained with reference to FIGS. 13 through 21. FIG. 13 is an oblique projection that explains an apparatus that is used in compression bending that is used in a method for manufacturing a winding body in the rotary electric machine according to Embodiment 1 of the present invention, and FIGS. 14 through 21 are respective process diagrams that explain the method for manufacturing a winding body in the rotary electric machine according to Embodiment 1 of the present invention.

As shown in FIG. 13, an apparatus that is used in compression bending according to the present invention includes: a pair of feeding rollers 41 and 42 for feeding the rectangular conductor wire 40; a gripping jig that grips and fixes the rectangular conductor wire 40; and formers that bend the rectangular conductor wire 40 by pressing near a root of the fixed rectangular conductor wire 40. The gripping jig includes: first and second chucks 43 and 44 that hold two facing flat surfaces that are constituted by short sides of the rectangular cross section of the rectangular conductor wire 40 (hereinafter "edgewise surfaces"); and third and fourth chucks 45 and 46 that hold two facing flat surfaces that are constituted by the long sides of the rectangular cross section of the rectangular conductor wire 40 (hereinafter "flatwise surfaces"). The formers include: first formers 47a and 47b that respectively push against the two facing edgewise surfaces of the rectangular conductor wire 40; and second formers 48a and 48b that respectively push against the two facing flatwise surfaces of the rectangular conductor wire 40.

The rectangular conductor wire 40 is first fed into the gripping jig by the pair of feeding rollers 41 and 42 (a conductor wire feeding step). The first and second chucks 43 and 44 are disposed so as to face the two edgewise surfaces of the rectangular conductor wire 40, and the third and fourth chucks 45 and 46 are disposed so as to face the two flatwise surfaces of the rectangular conductor wire 40. The first formers 47a and 47b are disposed near an outlet of the gripping jig so as to be able to push against the two edgewise surfaces of the rectangular conductor wire 40, and the second formers 48a and 48b are disposed near the outlet of the gripping jig so as to be able to push against the two flatwise surfaces of the rectangular conductor wire 40.

Then, when the rectangular conductor wire 40 reaches a set amount of feeding, driving of the feeding rollers 41 and 42 is stopped, and the first and second chucks 43 and 44 clamp the two edgewise surfaces of the rectangular conductor wire 40, and the third and fourth chucks 45 and 46 clamp the two flatwise surfaces of the rectangular conductor wire 40 (a conductor wire fixing step).

Figure 14:
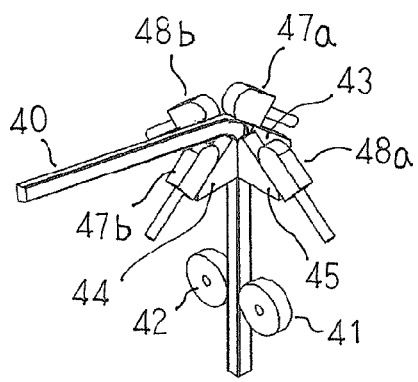
FIG. 14 is a process diagram that explains the method for manufacturing a winding body in the rotary electric machine according to Embodiment 1 of the present invention.

Next, the first former 47a is driven so as to move toward the root of the rectangular conductor wire 40 that is fixed by being gripped by the gripping jig to press a first edgewise surface of the rectangular conductor wire 40 (a conductor wire bending step). Thus, as shown in FIG. 14, the rectangular conductor wire 40 is bent by an angle that corresponds to the amount of movement of the first former 47a. A linking portion between a first rectilinear portion 22a and a first coil end 22c is bent and shaped thereby. Next, the driving of the first former 47a is stopped, and the first former 47a returns to its initial position. Then, the gripping and fixing of the rectangular conductor wire 40 by the first through fourth chucks 43 through 46 is released (a conductor wire fixing releasing step).

Figure 15:
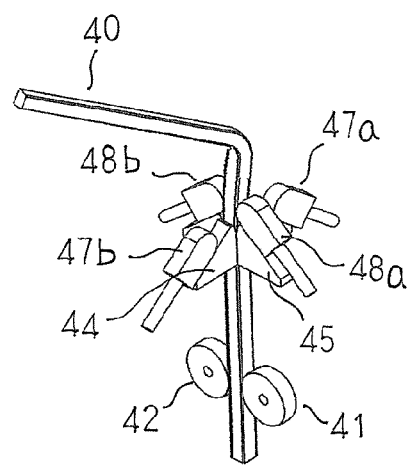
FIG. 15 is a process diagram that explains the method for manufacturing a winding body in the rotary electric machine according to Embodiment 1 of the present invention.

Next, as shown in FIG. 15, fixing is released, and the rectangular conductor wire 40 is fed by a set amount, and is gripped and fixed by the gripping jig, and the second formers 48*a* and 48*b* are driven to press the facing flatwise surfaces of the rectangular conductor wire 40. This series of steps is performed repeatedly while controlling the amount of feeding of the rectangular conductor wire 40 and the amount of movement of the second formers 48*a* and 48*b* such that an inclined portion of the first coil end 22*c* near the first rectilinear portion 22*a* is shaped into a circular arc shape.

Figure 16:
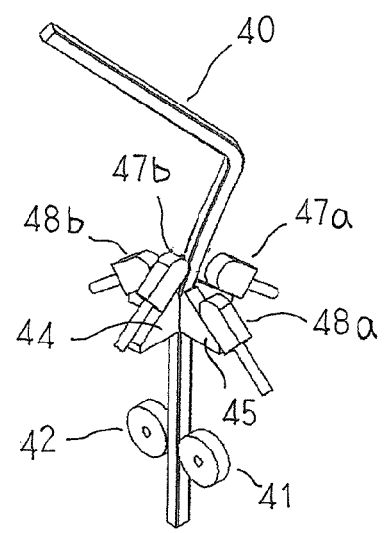
FIG. 16 is a process diagram that explains the method for manufacturing a winding body in the rotary electric machine according to Embodiment 1 of the present invention.

Next, fixing is released, and the rectangular conductor wire 40 is fed by a set amount, and is gripped and fixed by the gripping jig, and the first former 47*b* is driven. As shown in FIG. 16, the first former 47*b* thereby presses a second edgewise surface of the rectangular conductor wire 40 such that a bend portion of the first top portion 22*e* near the first rectilinear portion 22*a* is shaped by bending.

Figure 17:
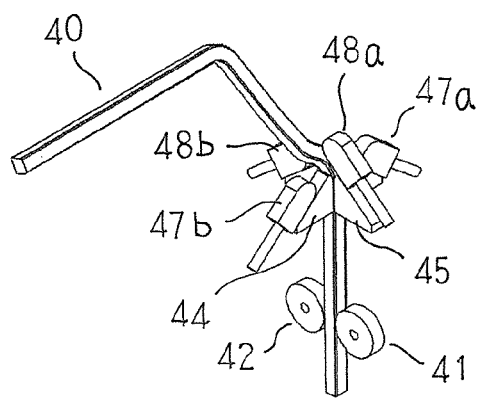
FIG. 17 is a process diagram that explains the method for manufacturing a winding body in the rotary electric machine according to Embodiment 1 of the present invention.
Figure 18:
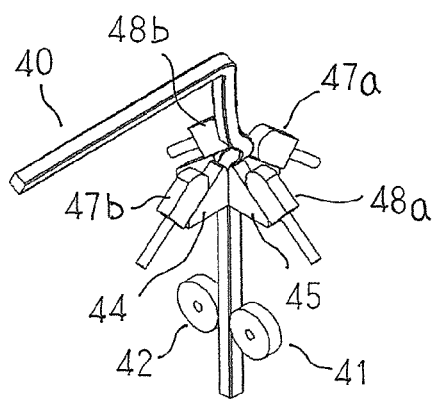
FIG. 18 is a process diagram that explains the method for manufacturing a winding body in the rotary electric machine according to Embodiment 1 of the present invention.

Next, fixing is released, and the rectangular conductor wire 40 is fed by a set amount, and is gripped and fixed by the gripping jig, and the second former 48*a* is driven. As shown in FIG. 17, the second former 48*a* thereby presses a first flatwise surface of the rectangular conductor wire 40 such that a bend portion of the crank portion $22e_1$ near the first rectilinear portion 22*a* is shaped by bending. In addition, fixing is released, and the rectangular conductor wire 40 is fed by a set amount, and is gripped and fixed by the gripping jig, and the second former 48*b* is driven. As shown in FIG. 18, the second former 48*b* thereby presses a second flatwise surface of the rectangular conductor wire 40 such that a bend portion of the crank portion $22e_1$ near a second rectilinear portion 22*b* is shaped by bending. The crank portion $22e_1$ is bent and shaped by these two steps.

Figure 19:
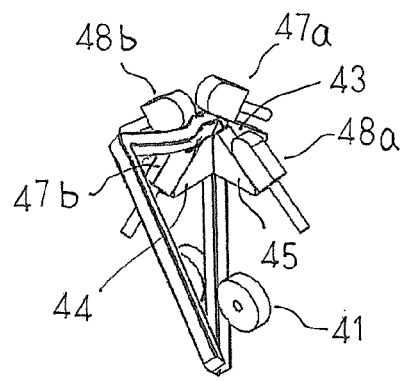
FIG. 19 is a process diagram that explains the method for manufacturing a winding body in the rotary electric machine according to Embodiment 1 of the present invention.

Next, fixing is released, and the rectangular conductor wire 40 is fed by a set amount, and is gripped and fixed by the gripping jig, and the first former 47*a* is driven. As shown in FIG. 19, the first former 47*a* thereby presses the first edgewise surface of the rectangular conductor wire 40 such that a bend portion of the first top portion 22*e* near the second rectilinear portion 22*b* is shaped by bending. Thus, a first top portion 22*e* that protrudes in a U shape or an angular C shape, and that has a crank portion $22e_1$, is shaped by bending.

Figure 20:
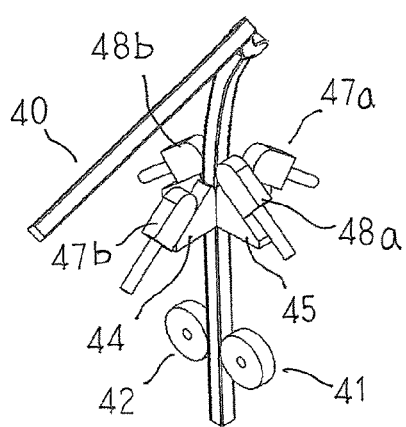
FIG. 20 is a process diagram that explains the method for manufacturing a winding body in the rotary electric machine according to Embodiment 1 of the present invention.

Next, as shown in FIG. 20, fixing is released, and the rectangular conductor wire 40 is fed by a set amount, and is gripped and fixed by the gripping jig, and the second formers 48*a* and 48*b* are driven to press the facing flatwise surfaces of the rectangular conductor wire 40. This series of steps is performed repeatedly while controlling the amount of feeding of the rectangular conductor wire 40 and the amount of movement of the second formers 48*a* and 48*b* such that an inclined portion of the first coil end 22*c* near the second rectilinear portion 22*b* is formed into a circular arc shape.

Figure 21:
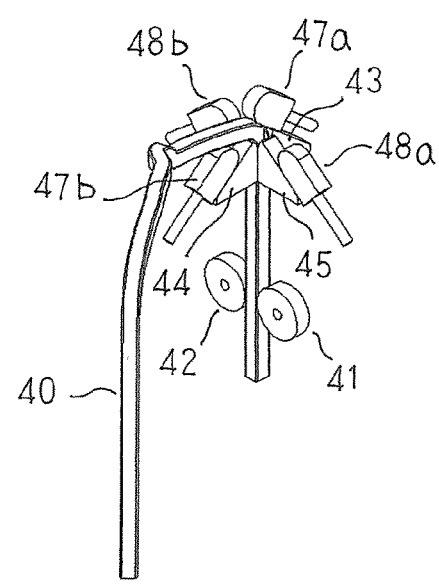
FIG. 21 is a process diagram that explains the method for manufacturing a winding body in the rotary electric machine according to Embodiment 1 of the present invention.

Next, fixing is released, and the rectangular conductor wire 40 is fed by a set amount, and is gripped and fixed by the gripping jig, and the first former 47*a* is driven. As shown in FIG. 21, the first former 47*a* thereby presses the first edgewise surface of the rectangular conductor wire 40 such that a linking portion between the first coil end 22*c* and the second rectilinear portion 22*b* is shaped by bending.

In this case, steps of bending and shaping a first coil end 22*c* have been explained, but a second coil end portion 22*d* is also shaped using similar or identical bending and shaping steps.

Thus, first coil ends 22*c* and second coil ends 22*d* are bent and shaped alternately by performing the conductor wire feeding step, the conductor wire fixing step, the conductor wire bending step, and the conductor wire fixing releasing step repeatedly to produce a winding body 22 in which the rectangular conductor wire 40 is wound for four turns into a helical shape. A winding body 22 in which spacing between the first rectilinear portions 22*a* and the second rectilinear portions 22*b* widens gradually toward a first side in a direction of arrangement of the rectilinear portions is produced by gradually increasing the respective amounts of feeding of the rectangular conductor wire 40 during bending and shaping of the first coil ends 22*c* and the second coil ends 22*d*.

In the method for manufacturing the winding body 22 according to Embodiment 1, because the winding body 22 is produced by performing the conductor wire feeding step, the conductor wire fixing step, the conductor wire bending step, and the conductor wire fixing releasing step repeatedly in this manner, punching and bending that uses a pressing die can be omitted. Thus, because the winding body 22 can be manufactured using a single apparatus, manufacturing steps can be reduced, enabling productivity to be increased. Furthermore, even if wire material, or dimensions, etc., are modified, the amount of springback of the wire material can be managed by controlling the amount of movement of the first through fourth chucks 43 through 46 and the amount of movement of the first and second formers 47*a*, 47*b*, 48*a*, and 48*b*, and the only preparation is modifying software for the apparatus, increasing productivity.

Because the winding body 22 is produced by performing bending and shaping while feeding a single rectangular conductor wire 40, stresses that act on the rectangular conductor wire 40 during bending and shaping are reduced, enabling the occurrence of damage to an insulating coating that is coated onto the rectangular conductor wire 40 to be suppressed. The occurrence of damage to the insulating coating that is coated onto the rectangular conductor wire 40 can also be suppressed because the stresses that act on the rectangular conductor wire 40 are smaller in compression bending than in punching and bending that uses a pressing die.

Now, in the above-mentioned method for manufacturing the winding body 22, a series of steps in which fixing is released, and the rectangular conductor wire 40 is fed by a set amount, and gripped and fixed using the gripping jig, and then the second formers 48*a* and 48*b* are driven to press the facing flatwise surfaces of the rectangular conductor wire 40, are performed repeatedly while controlling the amount of feeding of the rectangular conductor wire 40 and the amount of movement of the second formers 48*a* and 48*b* to shape the inclined portions of the first coil end 22*c* into circular arc shapes. However, the inclined portions in the first and second coil ends 22*c* and 22*d* may be shaped into circular arc shapes by driving the second formers 48*a* and 48*b* by a set amount, and ironing the rectangular conductor wire 40 using the second formers 48*a* and 48*b* while feeding the rectangular conductor wire 40 using the pair of feeding rollers 41 and 42 in a state in which the gripping and fixing of the rectangular conductor wire 40 by the first through fourth chucks 43 through 46 is released (an ironing process).

Figure 26:
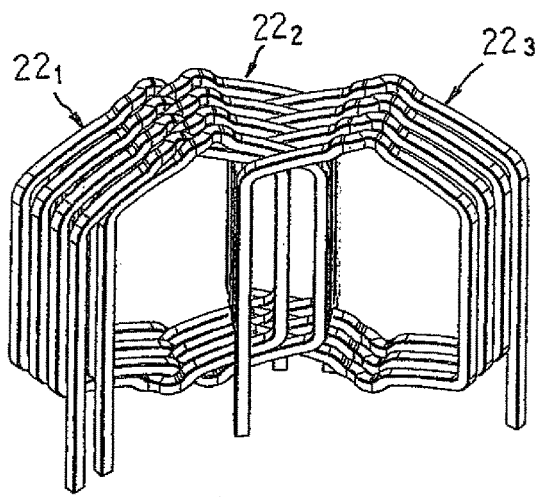
FIG. 26 is an oblique projection that explains the method for assembling a winding assembly in the rotary electric machine according to Embodiment 1 of the present invention.
Figure 27:
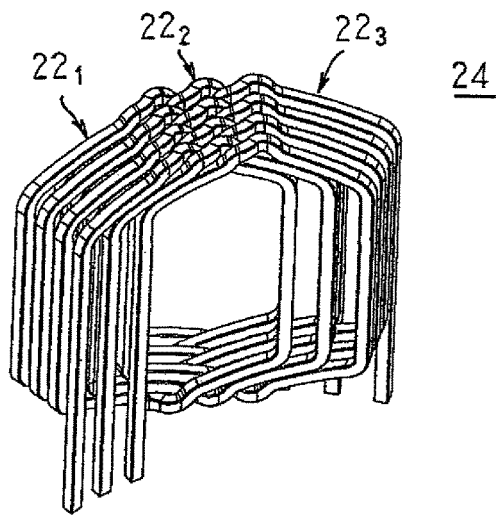
FIG. 27 is an oblique projection that explains the method for assembling a winding assembly in the rotary electric machine according to Embodiment 1 of the present invention.
Figure 28:
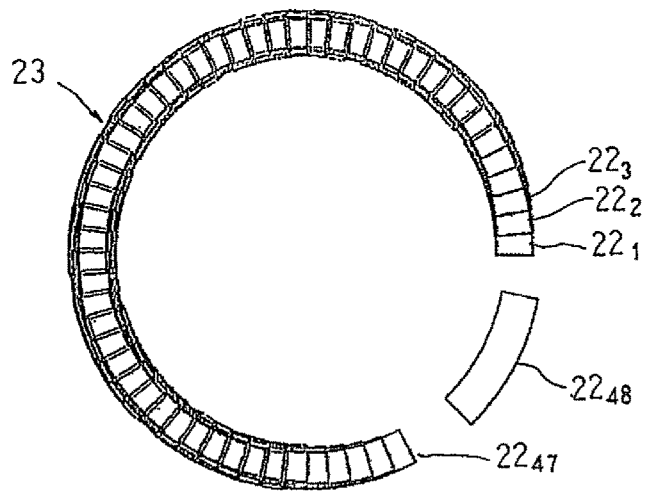
FIG. 28 is a schematic diagram that explains a procedure for installing a forty-eighth winding body in the method for assembling a winding assembly in the rotary electric machine according to Embodiment 1 of the present invention.
Figure 29:
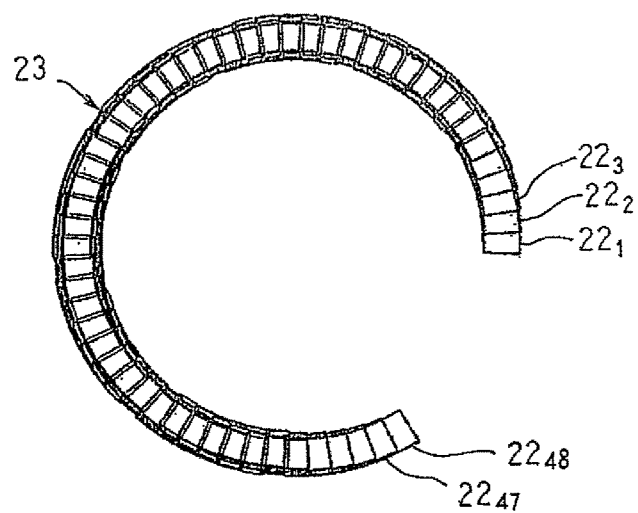
FIG. 29 is a schematic diagram that explains the procedure for installing the forty-eighth winding body in the method for assembling a winding assembly in the rotary electric machine according to Embodiment 1 of the present invention.
Figure 30:
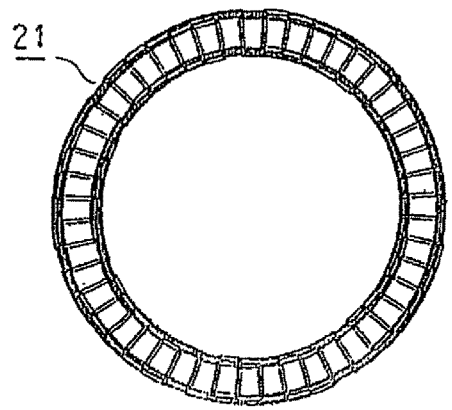
FIG. 30 is a schematic diagram that explains the procedure for installing the forty-eighth winding body in the method for assembling a winding assembly in the rotary electric machine according to Embodiment 1 of the present invention.

Next, a method for assembling the winding assembly 21 will be explained with reference to FIGS. 22 through 30. FIGS. 22 through 27 are oblique projections that explain a method for assembling the winding assembly in the rotary electric machine according to Embodiment 1 of the present invention, and FIGS. 28 through 30 are schematic diagrams that explain a procedure for installing a forty-eighth winding body in the method for assembling the winding assembly in the rotary electric machine according to Embodiment 1 of the present invention.

Here, to facilitate explanation, the winding bodies 22 are designated winding body $22_1$, winding body $22_2$, winding body $22_3$, winding body $22_{47}$, and winding body $22_{48}$ in order of mounting.

Figure 22:
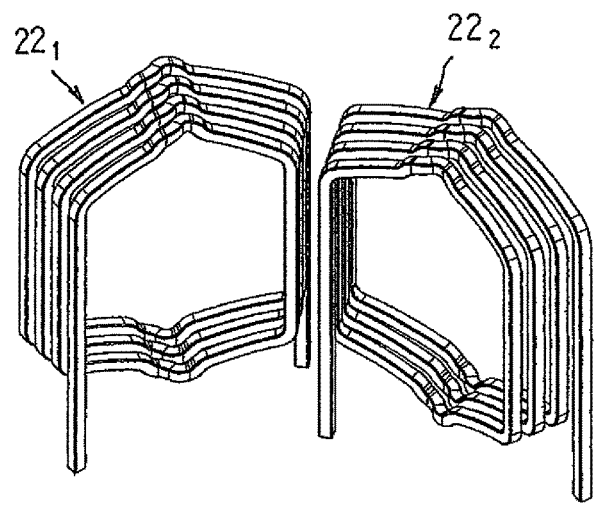
FIG. 22 is an oblique projection that explains a method for assembling a winding assembly in the rotary electric machine according to Embodiment 1 of the present invention.
Figure 23:
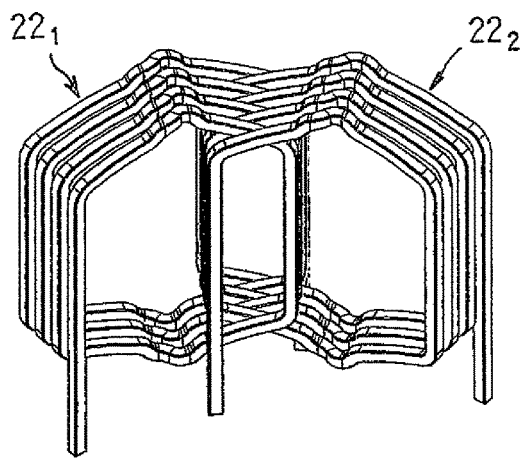
FIG. 23 is an oblique projection that explains the method for assembling a winding assembly in the rotary electric machine according to Embodiment 1 of the present invention.
Figure 24:
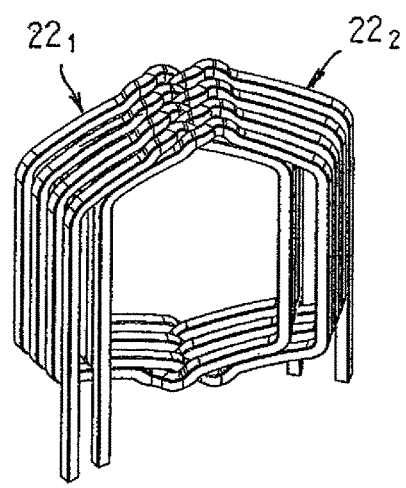
FIG. 24 is an oblique projection that explains the method for assembling a winding assembly in the rotary electric machine according to Embodiment 1 of the present invention.

As shown in FIG. 22, the first and second winding bodies $22_1$ and $22_2$ are placed circumferentially adjacent to each other so as to align axial height positions. Next, as shown in FIG. 23, the first rectilinear portions 22a of the second winding body $22_2$ are inserted between the second rectilinear portions 22b of the first winding body $22_1$, which have a gap d. Next, the second winding body $22_2$ is moved circumferentially until the first rectilinear portions 22a of the second winding body $22_2$ are at a position that is separated by a pitch of one slot (the angle between the slots) from the first rectilinear portions 22a of the first winding body $22_1$. The two winding bodies $22_1$ and $22_2$ are thereby assembled as shown in FIG. 24. In the assemblage of the two winding bodies $22_1$ and $22_2$, the rectangular conductor wire 40 of the winding body $22_2$ enters the gaps between the rectangular conductor wire 40 of the winding body $22_1$, overlapping with each other radially and increasing rigidity.

Figure 25:
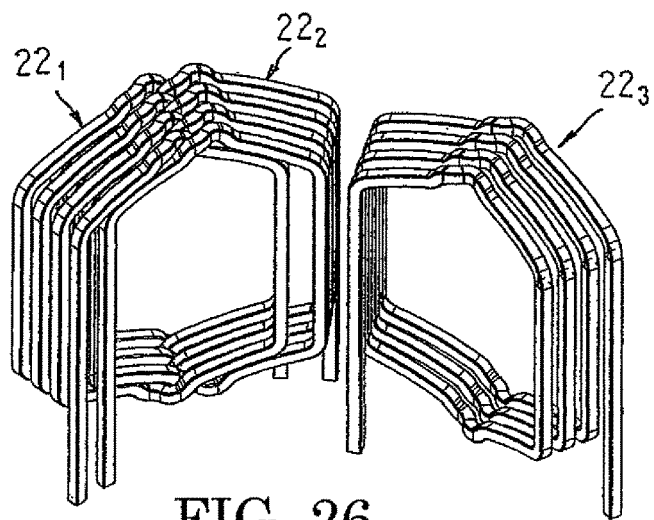
FIG. 25 is an oblique projection that explains the method for assembling a winding assembly in the rotary electric machine according to Embodiment 1 of the present invention.

Next, as shown in FIG. 25, the third winding body $22_3$ is placed circumferentially adjacent to the assemblage of the two winding bodies $22_1$ and $22_2$ so as to align axial height positions. Next, as shown in FIG. 26, the first rectilinear portions 22a of the third winding body $22_3$ are inserted between the second rectilinear portions 22b of the winding bodies $22_1$ and $22_2$. Next, the third winding body $22_3$ is moved circumferentially until the first rectilinear portions 22a of the third winding body $22_3$ are at a position that is separated by a pitch of one slot (the angle between the slots) from the first rectilinear portions 22a of the second winding body $22_2$. A sub-assembly 24 that is constituted by the three winding bodies $22_1$, $22_2$, and $22_3$ is thereby assembled as shown in FIG. 27.

Winding bodies 22 are additionally mounted sequentially by aligning axial height positions and moving them circumferentially until the forty-seventh winding body $22_{47}$. As shown in FIG. 28, the assemblage 23 in which the forty-seven winding bodies $22_1$ through $22_{47}$ are assembled is increased in diameter to form a C shape that is wider than a circumferential width of the forty-eighth winding body $22_{48}$ between the first winding body $22_1$ and the forty-seventh winding body $22_{47}$.

Next, as shown in FIG. 29, the forty-eighth winding body $22_{48}$ is mounted onto an end near the forty-seventh winding body $22_{47}$. In addition, as shown in FIG. 30, an opening of the C-shaped assemblage 23 is closed, and the first winding body $22_1$ and the forty-eighth winding body $22_{48}$ are fitted together, to assemble the annular winding assembly 21 that is shown in FIG. 5. In the winding assembly 21 that is assembled in this manner, forty-eight columns of eight first and second rectilinear portions 22a and 22b that are lined up in a single column radially are arranged circumferentially at a pitch of one slot.

Figure 31:
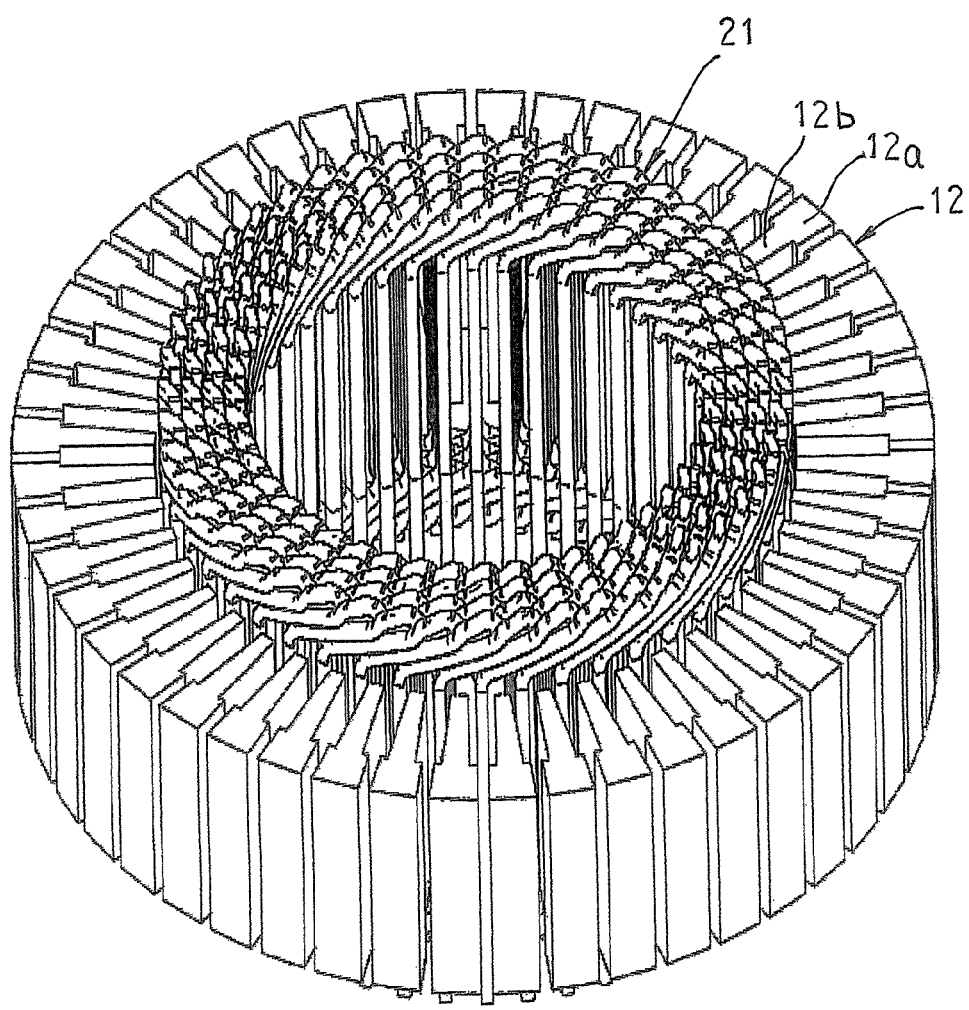
FIG. 31 is a diagram that explains a method for mounting a winding assembly into the armature core in the rotary electric machine according to Embodiment 1 of the present invention.
Figure 32:
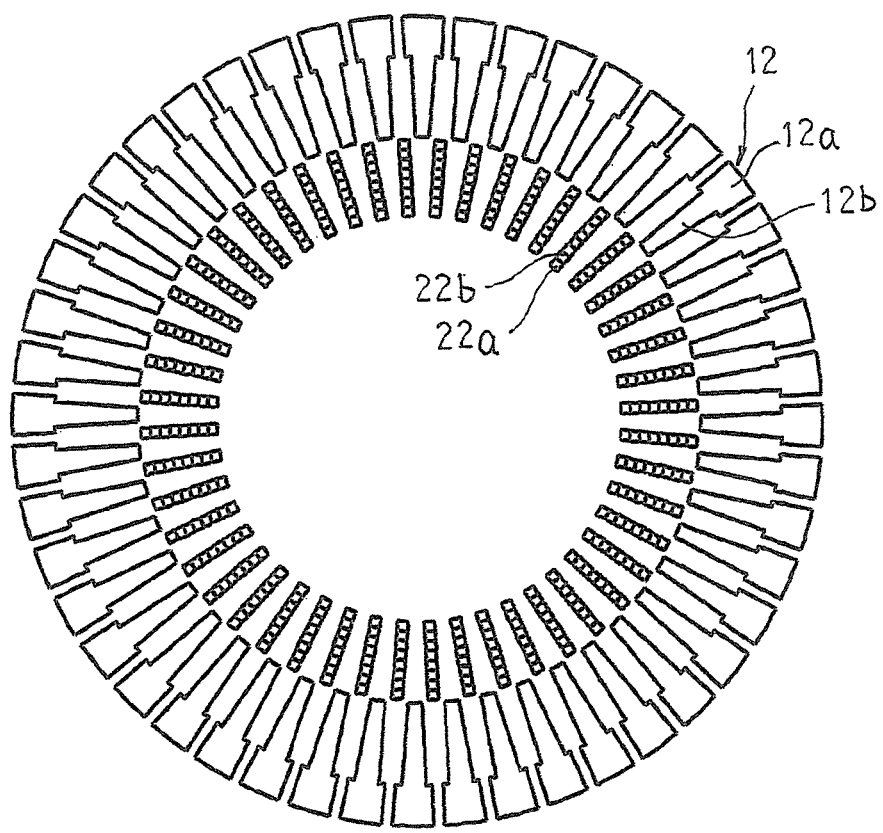
FIG. 32 is a diagram that explains a method for mounting a winding assembly into the armature core in the rotary electric machine according to Embodiment 1 of the present invention.
Figure 33:
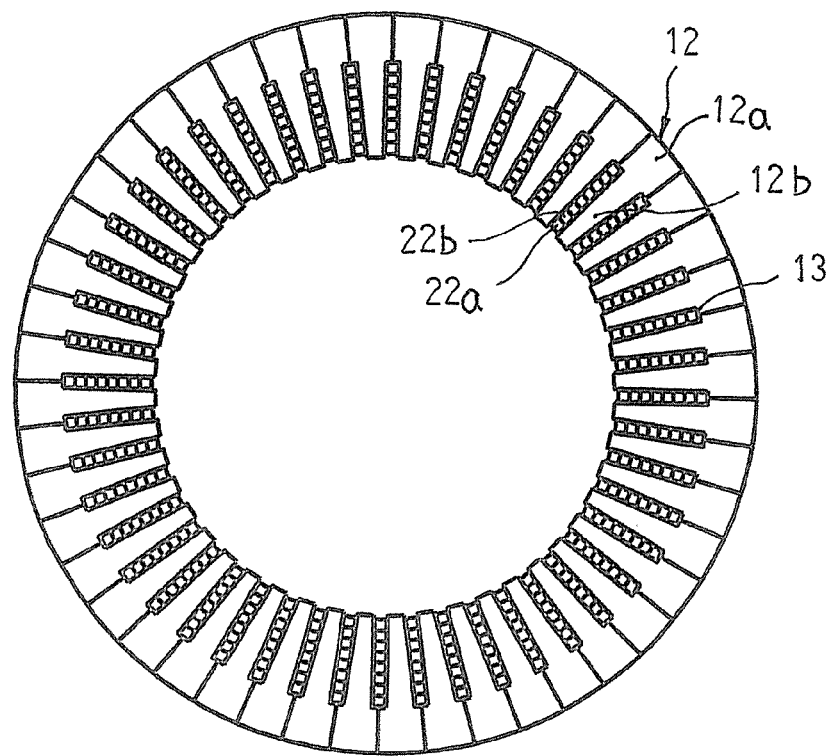
FIG. 33 is a diagram that explains the method for mounting a winding assembly into the armature core in the rotary electric machine according to Embodiment 1 of the present invention.
Figure 34:
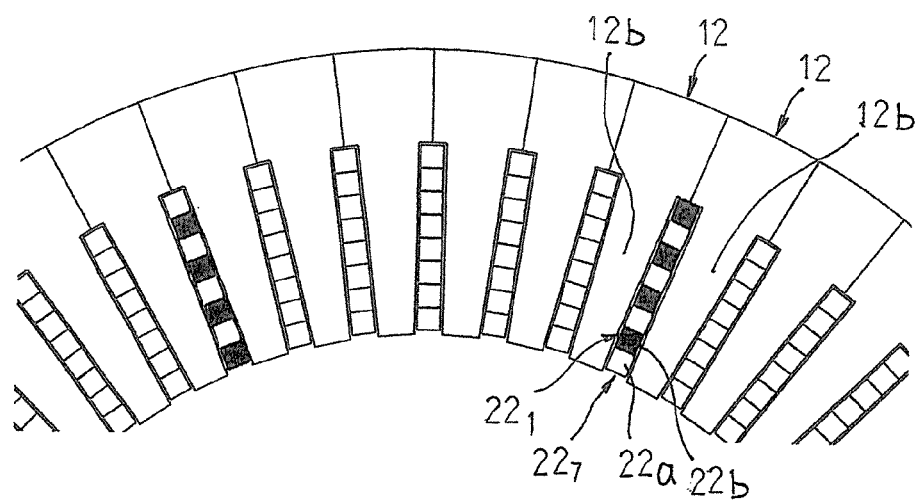
FIG. 34 is a diagram that explains the method for mounting a winding assembly into the armature core in the rotary electric machine according to Embodiment 1 of the present invention.

Next, a method for mounting the winding assembly 21 to the armature core 11 will be explained with reference to FIGS. 31 through 34. FIGS. 31 through 34 are diagrams that explain a method for mounting the winding assembly into the armature core in the rotary electric machine according to Embodiment 1 of the present invention, FIGS. 31 and 32 showing a state before the winding assembly is mounted, FIG. 33 showing a state after mounting of the winding assembly, and FIG. 34 showing the state after mounting of the winding assembly enlarged. Moreover, for simplicity, only the first and second rectilinear portions 22a and 22b of the winding assembly 21 are shown in FIGS. 32 through 34.

First, forty-eight core blocks 12 are arranged at an approximately uniform angular pitch circumferentially such that respective teeth are positioned on a radially outer side between adjacent columns of first and second rectilinear portions 22a and 22b of the winding assembly 21, as shown in FIGS. 31 and 32. Next, the core blocks 12 that are arranged circumferentially are simultaneously moved radially inward. The respective teeth 12b of the core blocks 12 are thereby inserted between the adjacent columns of first and second rectilinear portions 22a and 22b, and the circumferential side surfaces of the adjacent core blocks 12 are abutted with each other, preventing radially inward movement of the core blocks 12, and the winding assembly 21 is thereby mounted to the armature core 11, as shown in FIGS. 33 and 34. Inside each of the slots 13, eight first and second rectilinear portions 22a and 22b are housed such that the long sides of the rectangular cross sections are oriented circumferentially so as to line up neatly in a single column in a radial direction.

Thus, by moving the core blocks 12 that are arranged in a row circumferentially radially inward so as to be inserted into the winding assembly 21, the first and second rectilinear portions 22a and 22b that are lined up irregularly in the radial direction are arranged neatly in a column by movement that narrows the spacing between the teeth 12b of the adjacent core blocks 12. In addition, gaps between each of the first and second rectilinear portions 22a and 22b that are arranged neatly in a column in the radial direction are reduced and eliminated by the radially inward movement of the core back portions 12a of the core blocks 12. Thus, space factor of the rectangular conductor wires 40 inside the slots 13 can be improved. Because the rectangular conductor wires 40 inside the slots 13 and the core blocks 12 are in contact with each other, and heat transfer performance to the armature core 11 from the winding assembly 21, which constitutes a heat-generating body during passage of electric current, can be improved, temperature increases in the winding assembly 21 are suppressed, enabling increases in electrical resistance to be suppressed. Because the core blocks 12 are inserted such that the spacing between the adjacent teeth 12b becomes gradually narrower, sliding movement at contact surfaces between the armature winding 20 and the core blocks 12 is suppressed, enabling damage to insulating coatings of the rectangular conductor wires 40 to be prevented.

The crank portions $22e_1$ and $22f_1$ of the first and second top portions 22e and 22f are configured so as to be shifted in a radial direction so as to leave a gap d that is approximately equal to radial dimensions of the first and second rectilinear portions 22a and 22b. Thus, one winding body 22 can be mounted to another winding body 22 without interference by aligning the axial height positions and moving it toward the other winding body 22 circumferentially, enabling assembly of the winding assembly 21 to be improved.

In a step of inserting the teeth 12b of the core blocks 12 between the first and second rectilinear portions 22a and 22b from an outer circumferential side of the winding assembly 21, because tapered teeth 12b are inserted between each of the columns of first and second rectilinear portions 22a and 22b from radially outside and moved radially inward, the winding assembly 21 is mounted into the armature core 11 such that the first and second rectilinear portions 22a and 22b are arranged neatly into single columns.

A rotary electric machine 100 that uses the armature winding 20 that is connected in this manner operates as an eight-pole forty-eight-slot inner-rotor three-phase motor when set alternating-current power is supplied to the armature winding 20.

Moreover, in Embodiment 1 above, the winding body 22 is produced such that spacing between the first rectilinear portions 22a and the second rectilinear portions 22b widens gradually toward a first side in a direction of arrangement of the rectilinear portions, but a winding body 22 may be produced such that spacing between the first rectilinear portions 22a and the second rectilinear portions 22b becomes gradually narrower toward the first side in a direction of arrangement of the rectilinear portions.

In Embodiment 1 above, the columns of first rectilinear portions 22a and columns of second rectilinear portions 22b of the winding body 22 are explained as being separated by an angular pitch of six slots, but the pitch between the columns is not limited to an angular pitch of six slots. If the slots 13 are formed at a ratio of one slot per phase per pole, for example, an armature winding that has a distributed winding construction of full-pitch windings can be obtained if the pitch between the columns is set to an angular pitch of three slots.

Embodiment 2

In Embodiment 1 above, the winding body 22 is produced using only compression bending, but in Embodiment 2, a winding body 22 is produced using a combination of compression bending and punching and bending that uses a pressing die.

Figure 40:
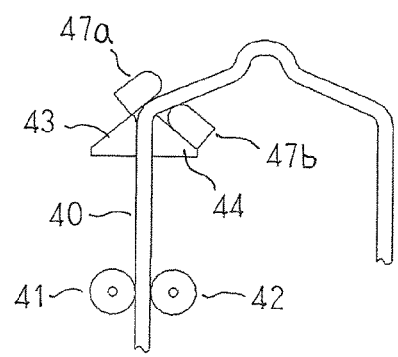
FIG. 40 is a process diagram that explains the method for manufacturing an intermediate winding body in the rotary electric machine according to Embodiment 2 of the present invention.
Figure 41:
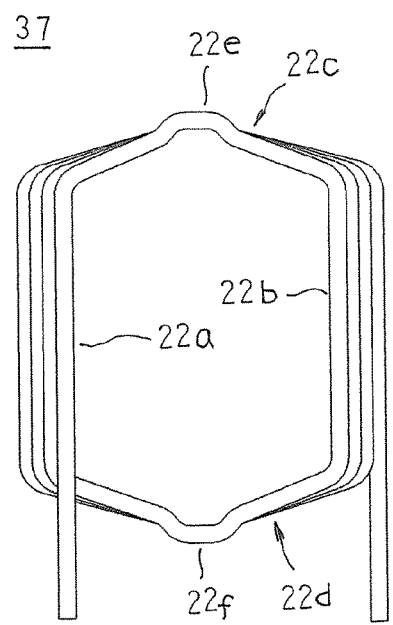
FIG. 41 is a front elevation that shows a first intermediate winding body in the rotary electric machine according to Embodiment 2 of the present invention.
Figure 42:
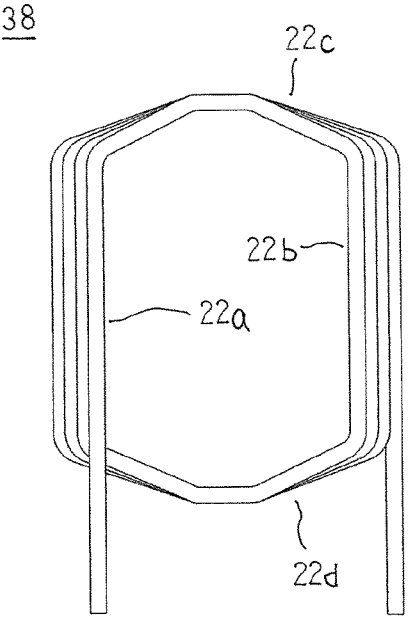
FIG. 42 is a front elevation that shows a second intermediate winding body in the rotary electric machine according to Embodiment 2 of the present invention.
Figure 43:
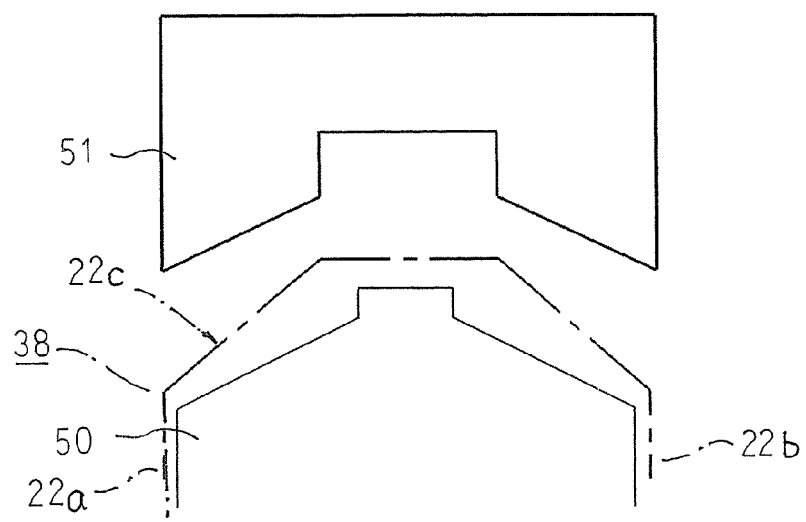
FIG. 43 is a schematic diagram that explains a method for forming a top portion of the second intermediate winding body in the rotary electric machine according to Embodiment 2 of the present invention.
Figure 44:
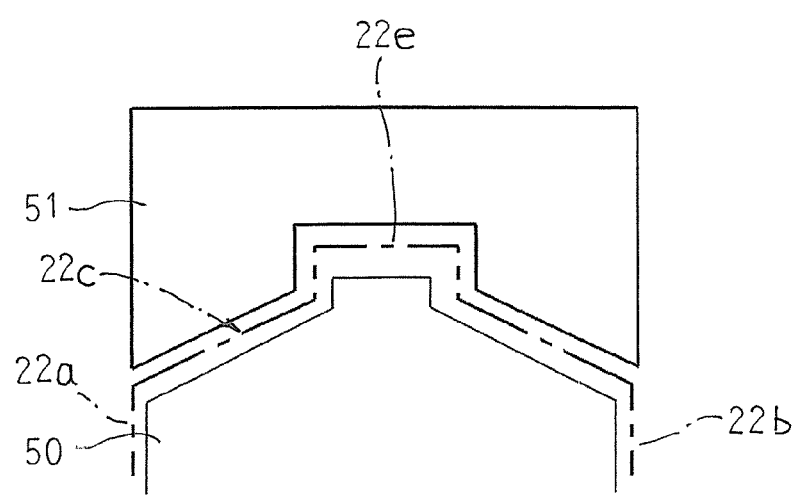
FIG. 44 is a schematic diagram that explains the method for forming the top portion of the second intermediate winding body in the rotary electric machine according to Embodiment 2 of the present invention.
Figure 45:
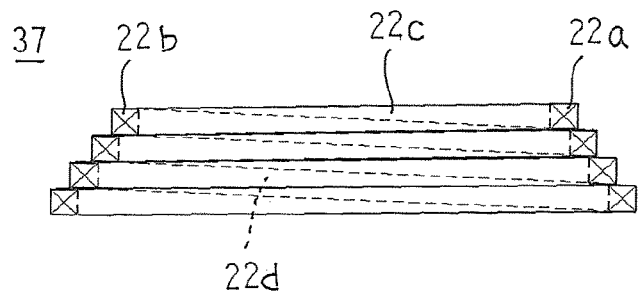
FIG. 45 is a plan that shows the first intermediate winding body in the rotary electric machine according to Embodiment 2 of the present invention.
Figure 46:
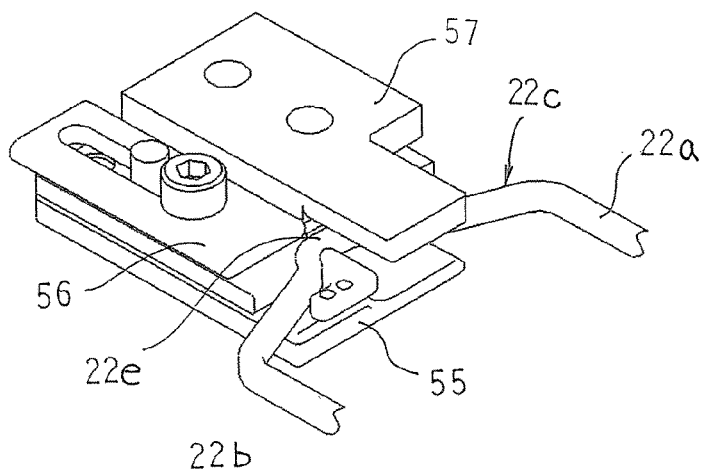
FIG. 46 is an oblique projection that explains a method for forming a crank portion of the first intermediate winding body in the rotary electric machine according to Embodiment 2 of the present invention.
Figure 47:
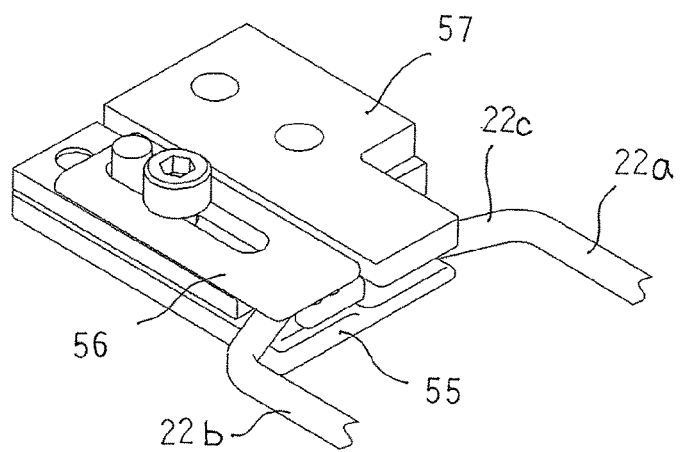
FIG. 47 is an oblique projection that explains the method for forming a crank portion of the first intermediate winding body in the rotary electric machine according to Embodiment 2 of the present invention.
Figure 48:
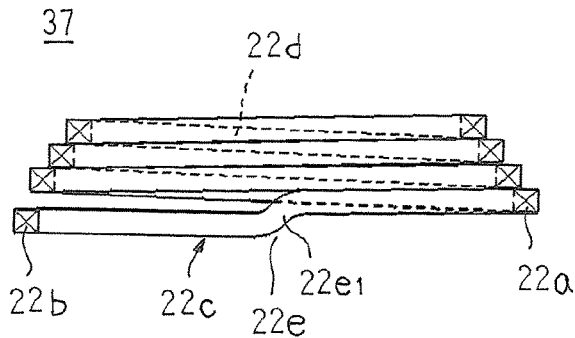
FIG. 48 is a plan that explains a step of forming crank portions of the first intermediate winding body in the rotary electric machine according to Embodiment 2 of the present invention.
Figure 49:
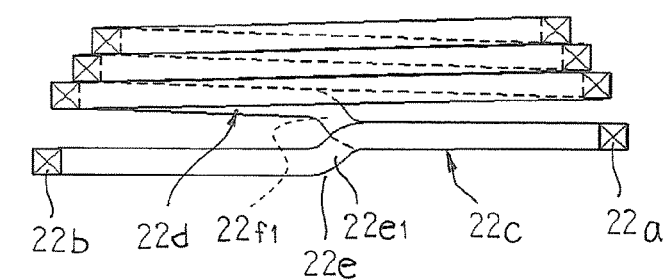
FIG. 49 is a plan that explains the step of forming crank portions of the first intermediate winding body in the rotary electric machine according to Embodiment 2 of the present invention.
Figure 50:
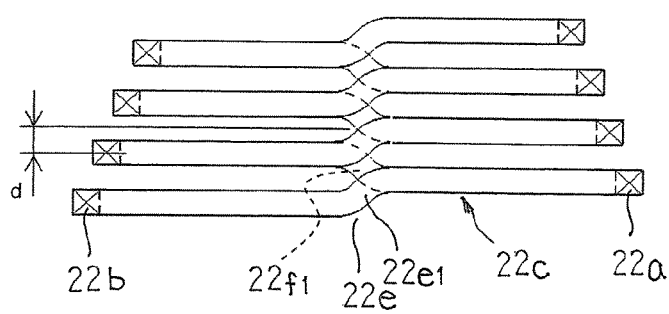
FIG. 50 is a plan that shows a third intermediate winding body in the rotary electric machine according to Embodiment 2 of the present invention.
Figure 51:
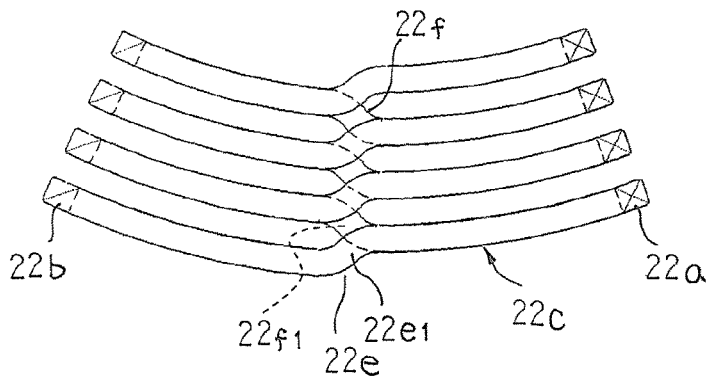
FIG. 51 is a plan that explains a method for forming circular arc-shaped inclined portions of coil ends of winding bodies in the rotary electric machine according to Embodiment 2 of the present invention.

A method for manufacturing the winding body 22 according to Embodiment 2 will be explained. FIGS. 35 through 40 are respective process diagrams that explain a method for manufacturing an intermediate winding body in a rotary electric machine according to Embodiment 2 of the present invention, FIG. 41 is a front elevation that shows a first intermediate winding body in the rotary electric machine according to Embodiment 2 of the present invention, FIG. 42 is a front elevation that shows a second intermediate winding body in the rotary electric machine according to Embodiment 2 of the present invention, FIGS. 43 and 44 are respective schematic diagrams that explain a method for forming a top portion of the second intermediate winding body in the rotary electric machine according to Embodiment 2 of the present invention, FIG. 45 is a plan that shows the first intermediate winding body in the rotary electric machine according to Embodiment 2 of the present invention, FIGS. 46 and 47 are respective oblique projections that explain a method for forming a crank portion of the first intermediate winding body in the rotary electric machine according to Embodiment 2 of the present invention, FIGS. 48 and 49 are respective plans that explain a step of forming crank portions of the first intermediate winding body in the rotary electric machine according to Embodiment 2 of the present invention, FIG. 50 is a plan that shows a third intermediate winding body in the rotary electric machine according to Embodiment 2 of the present invention, and FIG. 51 is a plan that explains a method for forming circular arc-shaped inclined portions of coil ends of winding bodies in the rotary electric machine according to Embodiment 2 of the present invention.

First, a method for manufacturing a first intermediate winding body 37 will be explained using FIGS. 35 through 40.

Figure 35:
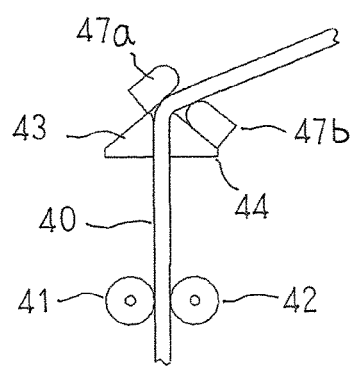
FIG. 35 is a process diagram that explains a method for manufacturing an intermediate winding body in a rotary electric machine according to Embodiment 2 of the present invention.

A rectangular conductor wire 40 is fed into a gripping jig by a pair of feeding rollers 41 and 42 (a conductor wire feeding step). Then, when the rectangular conductor wire 40 reaches a set amount of feeding, driving of the feeding rollers 41 and 42 is stopped, and first and second chucks 43 and 44 clamp two edgewise surfaces of the rectangular conductor wire 40 (a conductor wire fixing step). Next, a first former 47a is driven so as to move toward the root of the rectangular conductor wire 40 that is fixed by being gripped by the gripping jig to press a first edgewise surface of the rectangular conductor wire 40 (a conductor wire bending step). Thus, as shown in FIG. 35, the rectangular conductor wire 40 is bent by an angle that corresponds to the amount of movement of the first former 47a. A linking portion between a first rectilinear portion 22a and a first coil end 22c is bent and shaped thereby. Next, the driving of the first former 47a is stopped, and the first former 47a returns to its initial position. Then, the gripping and fixing of the rectangular conductor wire 40 by the first and second chucks 43 and 44 is released (a conductor wire fixing releasing step).

Figure 36:
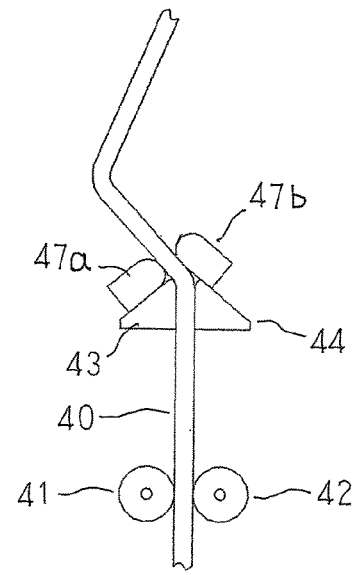
FIG. 36 is a process diagram that explains the method for manufacturing an intermediate winding body in the rotary electric machine according to Embodiment 2 of the present invention.

Next, fixing is released, and the rectangular conductor wire 40 is fed by a set amount, and is gripped and fixed by the gripping jig, and the first former 47b is driven. As shown in FIG. 36, the first former 47b thereby presses a second edgewise surface of the rectangular conductor wire 40 such that a bend portion of the first top portion 22e near the first rectilinear portion 22a is shaped by bending.

Figure 37:
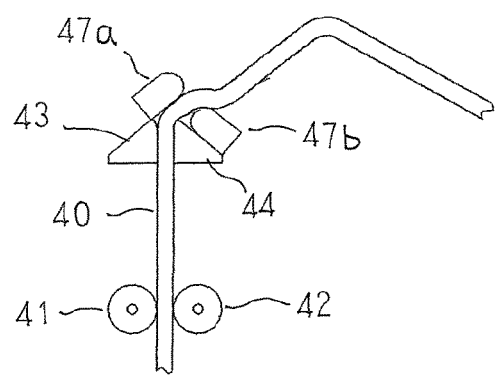
FIG. 37 is a process diagram that explains the method for manufacturing an intermediate winding body in the rotary electric machine according to Embodiment 2 of the present invention.

Next, fixing is released, and the rectangular conductor wire 40 is fed by a set amount, and is gripped and fixed by the gripping jig, and the first former 47a is driven. As shown in FIG. 37, the first former 47a thereby presses the first edgewise surface of the rectangular conductor wire 40 such that the rectangular conductor wire 40 is folded back.

Figure 38:
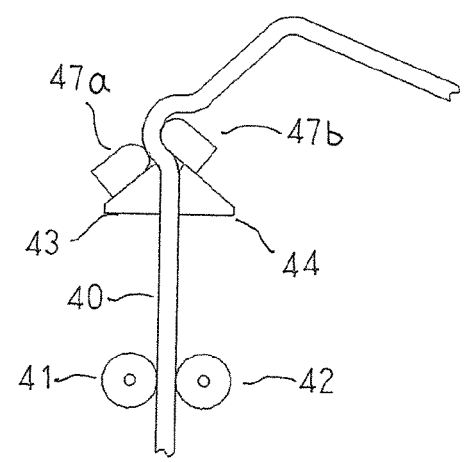
FIG. 38 is a process diagram that explains the method for manufacturing an intermediate winding body in the rotary electric machine according to Embodiment 2 of the present invention.

Next, fixing is released, and the rectangular conductor wire 40 is fed by a set amount, and is gripped and fixed by the gripping jig, and the first former 47b is driven. As shown in FIG. 38, the first former 47b thereby presses a second edgewise surface of the rectangular conductor wire 40 such that a bend portion of the first top portion 22e near the second rectilinear portion 22b is shaped by bending. Thus, a U-shaped or angular C-shaped first top portion 22e is formed.

Figure 39:
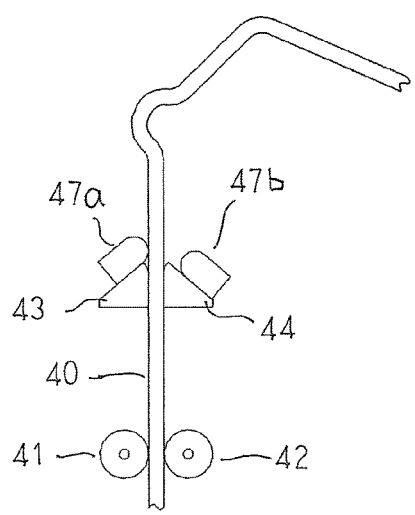
FIG. 39 is a process diagram that explains the method for manufacturing an intermediate winding body in the rotary electric machine according to Embodiment 2 of the present invention.

Next, as shown in FIG. 39, fixing is released, and the rectangular conductor wire 40 is fed by a set amount. Then, the rectangular conductor wire 40 is gripped and fixed by the gripping jig, and the first former 47a is driven. As shown in FIG. 40, the first former 47a thereby presses the first edgewise surface of the rectangular conductor wire 40 such that a linking portion between the first coil end 22c and the second rectilinear portion 22b is shaped by bending.

In this case, steps of bending and shaping a first coil end 22c have been explained, but a second coil end portion 22d is also shaped using similar or identical bending and shaping steps.

Thus, first coil ends 22c and second coil ends 22d are bent and shaped alternately by performing the conductor wire feeding step, the conductor wire fixing step, the conductor wire bending step, and the conductor wire fixing releasing step repeatedly to produce a first intermediate winding body 37 in which the rectangular conductor wire 40 is wound for four turns into a helical shape. As shown in FIG. 41, crank portions $22e_1$ and $22f_1$ are not formed on the first and second top portions 22e and 22f of this first intermediate winding body 37. A first intermediate winding body 37 in which spacing between the first rectilinear portions 22a and the second rectilinear portions 22b widens gradually toward a first side in a direction of arrangement of the rectilinear portions is produced by gradually increasing the respective amounts of feeding of the rectangular conductor wire 40 during bending and shaping of the first coil ends 22c and the second coil ends 22d.

Moreover, in the above-mentioned method for manufacturing the first intermediate winding body 37, first and second top portions 22e and 22f that protrude in a U shape or in an angular C shape are shaped by bending in a step of bending and shaping the first and second coil ends 22c and 22d, but the step of bending and shaping the first and second top portions 22e and 22f may be omitted from the step of bending and shaping the first and second coil ends 22c and 22d. In that case, as shown in FIG. 42, a second intermediate winding body 38 is produced in which first and second top portions 22e and 22f that protrude in a U shape or in an angular C shape are not formed. Then a step of bending and shaping the first and second top portions 22e and 22f is required for the second intermediate winding body 38.

Next, the step of bending and shaping the first and second top portions 22e and 22f will be explained. As shown in FIGS. 43 and 44, a bundle of first coil ends 22c of the second intermediate winding body 38 is sandwiched between a lower die 50 and an upper die 51, and is bent and shaped so as to have a U shape or an angular C shape. A bundle of second coil ends 22d of the second intermediate winding body 38 is similarly sandwiched between a lower die 50 and an upper die 51, and is bent and shaped so as to have a U shape or an angular C shape. A first intermediate winding body 37 in which first and second top portions 22e and 22f are formed on the first and second coil ends 22c and 22d is obtained thereby.

Because crank portions $22e_1$ and $22f_1$ are not formed on the first and second top portions 22e and 22f of a first intermediate winding body 37 that is produced in this manner, the first and second coil ends 22c and 22d are straight, as shown in FIG. 45.

Next, the step of bending and shaping the crank portions $22e_1$ and $22f_1$ will be explained.

As shown in FIG. 46, spacing between the first coil ends 22c is widened, and the first coil end 22c that is positioned at a first end in a direction of arrangement of the first and second rectilinear portions 22a and 22b is placed on a lower die 55. Then, as shown in FIG. 47, the inclined portion near the first rectilinear portion 22a of the first coil end 22c is fixed to the lower die 55 using a holding chuck 56. Next, an upper die 57 is pushed down to sandwich the first top portion 22e of the first coil end 22c and the inclined portion near the second rectilinear portion 22b against the lower die 55. The surface of the lower die 55 that contacts the first top portion 22e of the first coil end 22c and the inclined portion near the second rectilinear portion 22b is a step lower than the surface that contacts the inclined portion near the first rectilinear portion 22a of the first coil end 22c. Thus, as shown in FIG. 48, a crank portion $22e_1$ is shaped by bending on the first top portion 22e of a single first coil end 22c.

Next, spacing between the second coil ends 22d is widened, and the second coil end 22d that is positioned at a first end in a direction of arrangement of the first and second rectilinear portions 22a and 22b is placed on the lower die 55. Then, the inclined portion near the second rectilinear portion 22b of the second coil end 22d is fixed to the lower die 55 using a holding chuck 56. Next, the upper die 57 is pushed down to sandwich the second top portion 22f of the second coil end 22d and the inclined portion near the first rectilinear portion 22a against the lower die 55. Thus, as shown in FIG. 49, a crank portion $22f_1$ is shaped by bending on the second top portion 22f of a single second coil end 22d.

Crank portions $22e_1$ and $22f_1$ are similarly shaped by bending sequentially on the first and second top portions 22e and 22f of the first and second coil ends 22c and 22d to produce a third intermediate winding body 39 that is shown in FIG. 50. In the third intermediate winding body 39, the inclined portions of the first and second coil ends 22c and 22d have rectilinear shapes, and are arranged at a pitch of 2d in the direction of arrangement of the first and second rectilinear portions 22a and 22b.

Next, although not shown, plates that have circular arc-shaped cross sections that have a thickness d are inserted between each of the inclined portions of the first coil ends 22c that are adjacent in the direction of arrangement of the first and second rectilinear portions 22a and 22b. In addition, plates that have circular arc-shaped cross sections that have a thickness d are inserted between each of the inclined portions of the second coil ends 22d that are adjacent in the direction of arrangement of the first and second rectilinear portions 22a and 22b. Next, pressure is applied from two sides in the direction of arrangement of the first and second rectilinear portions 22a and 22b to the rows of inclined portions between which the plates are inserted using a die that has a circular arc-shaped curved surface on an inner circumferential surface and a die that has a circular arc-shaped curved surface on an outer circumferential surface. The inclined portions are thereby shaped by bending into a circular arc shape to produce the winding body 22, as shown in FIG. 51. In this winding body 22, curvature of the inclined portions becomes gradually larger or smaller toward a first side in the direction of arrangement of the first and second rectilinear portions 22a and 22b.

In Embodiment 2, a first intermediate winding body 37, on which crank portions $22e_1$ and $22f_1$ are not formed, or a second intermediate winding body 38, on which first and second top portions 22e and 22f and crank portions $22e_1$ and $22f_1$ are not formed, is produced by repeatedly performing a conductor wire feeding step, a conductor wire fixing step, a conductor wire bending step that uses compression bending, and a conductor wire fixing releasing step. Thus, steps that involve punching and bending that uses a pressing die are reduced, enabling tool modifying steps and setup steps that accompany modification of wire material, dimensions, etc., to be minimized, and enabling productivity to be improved, and the occurrence of damage to the insulating coating that is coated onto the rectangular conductor wire 40 can be suppressed.

Because the crank portions $22e_1$ and $22f_1$ are shaped by bending using punching and bending that uses a pressing die, the dimensional precision of the bent shapes of the crank portions $22e_1$ and $22f_1$ is increased. Thus, irregularities in the positions of the winding bodies 22 that arise when the winding bodies 22 are assembled into an annular shape are suppressed. As a result, interference between the core blocks 12 and the winding bodies 22 during insertion of the core blocks 12 into the winding assembly 21 is suppressed, improving assembly of the armature, and increasing productivity, and also enabling the occurrence of damage to the insulating coating that is coated onto the rectangular conductor wire 40 to be suppressed.

Because the crank portions $22e_1$ and $22f_1$ are shaped by bending individually on each of the first and second coil ends 22c and 22d using punching and bending that uses a pressing die, stresses that act on the rectangular conductor wire 40 are reduced, enabling the occurrence of damage to the insulating coating to be suppressed, and also enabling manufacturing equipment to be reduced in size.

Because the inclined portions of the first and second coil ends 22c and 22d are shaped by bending into a circular arc shape using a pressing die, dimensional precision of the bent shapes of the inclined portions is increased. Thus, irregularities in the positions of the winding bodies 22 that arise when the winding bodies 22 are assembled into an annular shape are suppressed. As a result, interference between the core blocks 12 and the winding bodies 22 during insertion of the core blocks 12 into the winding assembly 21 is suppressed, improving assembly of the armature, and increasing productivity, and also enabling the occurrence of damage to the insulating coating that is coated onto the rectangular conductor wire 40 to be suppressed.

Because plates are interposed between the inclined portions of the first and second coil ends 22c and 22d before applying pressure using a pressing die, stresses that act on each of the inclined portions are reduced, enabling the occurrence of damage to the insulating coating that is coated onto the rectangular conductor wire 40 to be suppressed.

Moreover, in each of the above embodiments, an eight-pole forty-eight-slot rotary electric machine has been explained, but it goes without saying that the number of poles and the number of slots are not limited to eight poles and forty-eight slots.

In each of the above embodiments, winding bodies are configured by winding rectangular conductor wire for four turns into a helical shape, but the number of turns of the rectangular conductor wire is not limited to four turns provided that it is greater than or equal to two turns.

In each of the above embodiments, cases in which the present application has been applied to an electric motor have been explained, but similar or identical effects are also exhibited if the present application is applied to a generator.

In each of the above embodiments, cases in which the present application has been applied to a rotary electric machine have been explained, but the electric machines to which the present application can be applied are not limited to rotary electric machines, and similar or identical effects are also exhibited if the present application is applied to a direct acting machine such as a linear motor. In that case, inclined portions of coil ends of winding bodies are not shaped by bending into a circular arc shape, but are straight, and spacing between columns of first rectilinear portions and columns of second rectilinear portions is constant.

The invention claimed is:

1. A method for manufacturing an armature winding for an electric machine, said armature winding comprising a plurality of winding bodies that are each configured by winding a rectangular conductor wire into a helical shape for m turns, where m is a natural number that is greater than or equal to two, so as to comprise:
   rectilinear portions that are arranged into two columns such that m of said rectilinear portions line up in each of said columns; and
   coil ends that link together end portions of said rectilinear portions between said columns,
   crank portions that displace said rectilinear portions that are linked by said coil ends by a set amount in a direction of arrangement of said rectilinear portions being formed centrally on said coil ends, and
   said plurality of winding bodies each being arranged at a pitch of one slot in a direction of arrangement of slots such that each of said columns of said rectilinear portions that are arranged into two columns are housed in respective slots of said armature core that are positioned on two sides of a consecutive plurality of teeth,
   wherein said rectangular conductor wire is wound helically such that linking portions between said rectilinear portions and said coil ends are shaped by bending to set angles while feeding said rectangular conductor wire, by repeating:
   a conductor wire feeding step in which said rectangular conductor wire is fed in a longitudinal direction of said rectangular conductor wire by a set amount of feeding;
   a conductor wire fixing step in which said rectangular conductor wire is gripped and fixed by a gripping jig;
   a conductor wire bending step in which compression bending is performed on said rectangular conductor wire by pressing a former against a root of said rectangular conductor wire that projects out of said gripping jig; and
   a conductor wire fixing releasing step in which gripping and fixing of said rectangular conductor wire by said gripping jig is released.

2. The method for manufacturing an armature winding for an electric machine according to claim 1, wherein said amount of feeding of said rectangular conductor wire is adjusted in said conductor wire feeding step such that a pitch between columns of said rectilinear portions that are arranged in two columns becomes gradually narrower or wider toward one side in a direction of arrangement of said rectilinear portions.

3. The method for manufacturing an armature winding for an electric machine according to claim 1, wherein:
   said gripping jig is configured so as to grip and fix four sides of said rectangular conductor wire; and
   said former comprises:
      first formers that press against two first facing outer circumferential surfaces of said rectangular conductor wire; and
      second farmers that press against two second facing outer circumferential surfaces of said rectangular conductor wire; and
   said linking portions between said rectilinear portions and said coil ends are shaped by bending by compression bending said rectangular conductor wire using said first formers, and said crank portions are shaped by bending by compression bending said rectangular conductor wire using said second formers, in said conductor wire bending step.

4. The method for manufacturing an armature winding for an electric machine according to claim 3, wherein said coil ends are shaped by bending using said second formers into a circular arc shape between said linking portions with said rectilinear portions and said crank portions when viewed from outside in a longitudinal direction of said rectilinear portions in said conductor wire bending step.

5. The method for manufacturing an armature winding for an electric machine according to claim 1, further comprising, after said rectangular conductor wire is wound helically by bending and shaping said linking portions between said rectilinear portions and said coil ends to set angles while feeding said rectangular conductor wire to produce a winding body without crank portions, a crank portion forming step in which said crank portions are formed by bending by applying bending using a pressing die individually to each of said coil ends of said winding body without crank portions.

6. The method for manufacturing an armature winding for an electric machine according to claim 5, further comprising a salient portion forming step in which salient portions are formed centrally on said coil ends by bending by applying bending using a pressing die to a bundle of coil ends of said winding body without crank portions before said crank portion forming step.

7. The method for manufacturing an armature winding for an electric machine according to claim 5, further comprising a circular arc shape forming step in which a portion of said coil ends between linking portions with said rectilinear portions and said crank portions is shaped by bending into a circular arc shape by applying bending using a pressing die to said portion.

* * * * *